United States Patent [19]
Viitanen et al.

[11] Patent Number: 4,553,373
[45] Date of Patent: Nov. 19, 1985

[54] METHOD AND APPARATUS FOR PACKAGING ARTICLES SUCH AS FRUIT

[75] Inventors: Veikko K. Viitanen; William C. Kreamer, both of San Jose, Calif.

[73] Assignee: FMC Corporation, Chicago, Ill.

[21] Appl. No.: 418,126

[22] Filed: Sep. 14, 1982

[51] Int. Cl.⁴ .................. B65B 11/50; B65B 51/14
[52] U.S. Cl. .................................. 53/441; 53/453; 53/556; 53/559
[58] Field of Search ............. 53/556, 559, 560, 441, 53/453, 454, 373, 463

[56] References Cited

U.S. PATENT DOCUMENTS

| | | |
|---|---|---|
| 2,141,318 | 12/1938 | Salfisberg . |
| 2,289,668 | 7/1942 | Mallory .............. 53/559 X |
| 2,297,041 | 5/1952 | Stokes . |
| 2,438,089 | 3/1948 | Carson . |
| 2,486,759 | 11/1949 | Pfeiffer . |
| 2,490,781 | 12/1949 | Cloud .................. 53/559 |
| 2,494,484 | 1/1950 | Nicolle . |
| 2,902,808 | 9/1959 | Lang .................... 53/560 |
| 3,333,395 | 8/1967 | Doucette et al. ....... 53/555 |
| 3,370,957 | 2/1968 | Wagner et al. . |
| 3,381,444 | 5/1968 | Vaughan . |
| 3,597,899 | 8/1971 | Hanson ................ 53/556 |
| 3,665,673 | 5/1972 | Billett et al. . |
| 3,686,820 | 8/1972 | Zenger et al. ......... 53/555 |
| 3,686,822 | 8/1972 | Wolfelsperger . |
| 3,851,440 | 12/1974 | Horsky . |
| 3,871,155 | 3/1975 | Blaser ................. 53/559 X |
| 3,884,016 | 5/1975 | Bostrom . |
| 3,933,569 | 1/1976 | Grasvoll . |
| 4,008,351 | 2/1977 | Inoue et al. . |
| 4,134,246 | 1/1979 | Michels .............. 53/559 X |

*Primary Examiner*—Horace M. Culver
*Attorney, Agent, or Firm*—A. J. Moore; H. M. Stanley; R. B. Megley

[57] ABSTRACT

A method, apparatus, and article of manufacture is disclosed which involves capturing portions of thermosealing packaging material such as film, stretching the film portions over the article to define isolated annuluses of contacting film, and severing the captured film portions together in isolated areas of the film for providing an annular seal about the article thereby providing a packaged article with the film and the annular seal tightly stretched over and conforming to the shape of the article. If the article is a living article such as a grapefruit, the packaging material is a gas permeable film which minimizes moisture migration from the article and from the package while permitting gases to diffuse into and out of the package slowing down the catabolistic destruction of the living article and resulting in greatly extended shelf life of the article.

25 Claims, 26 Drawing Figures

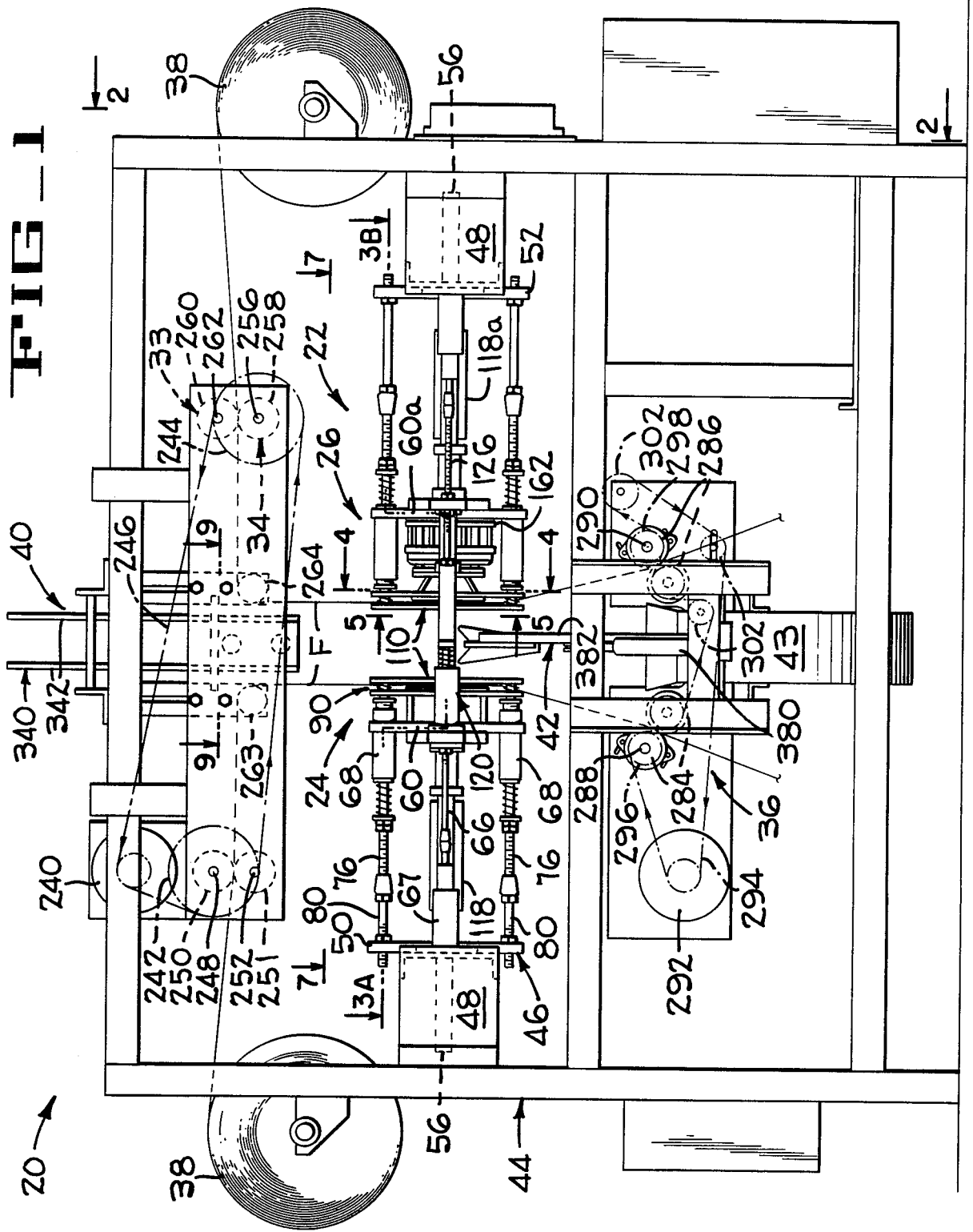

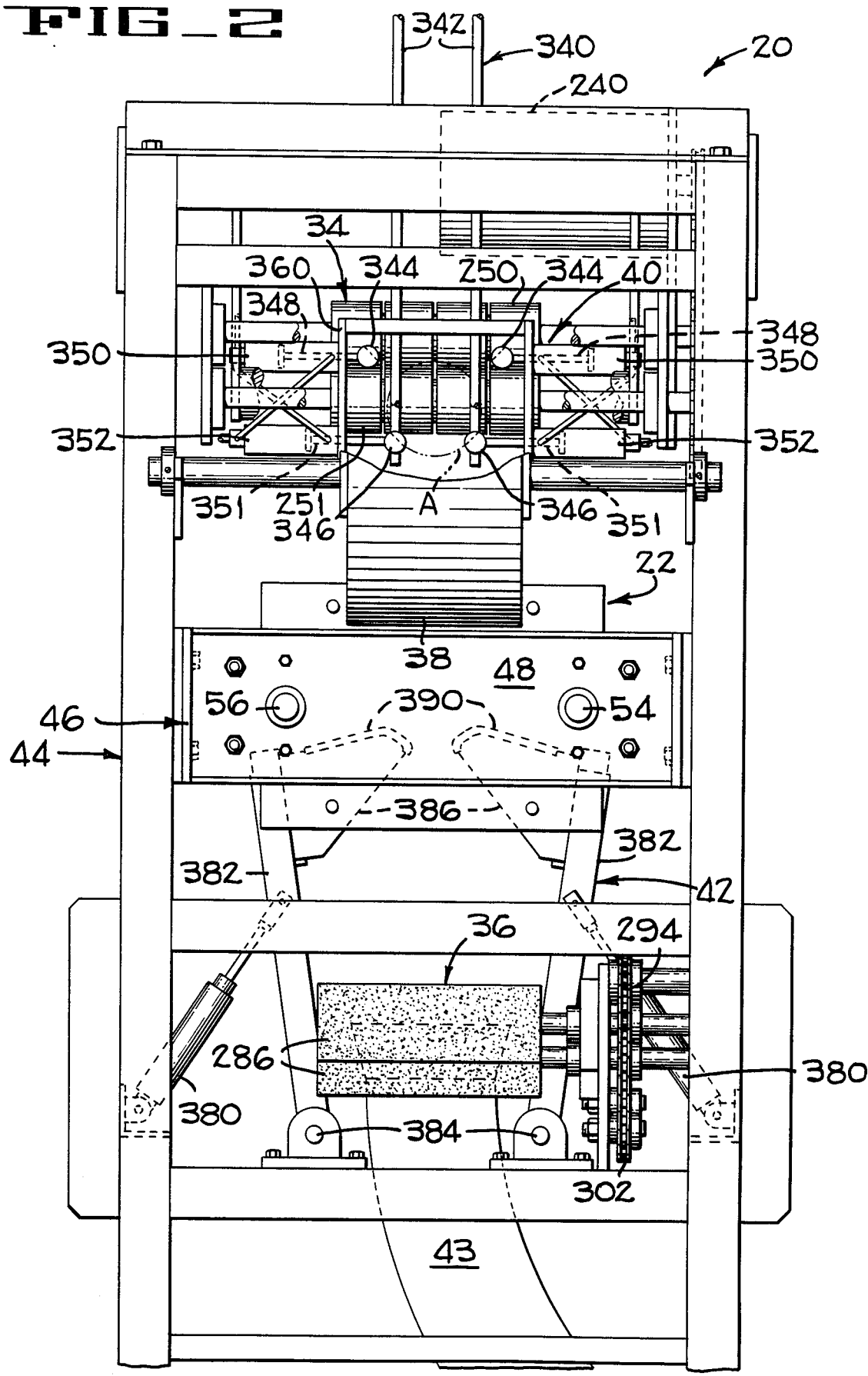

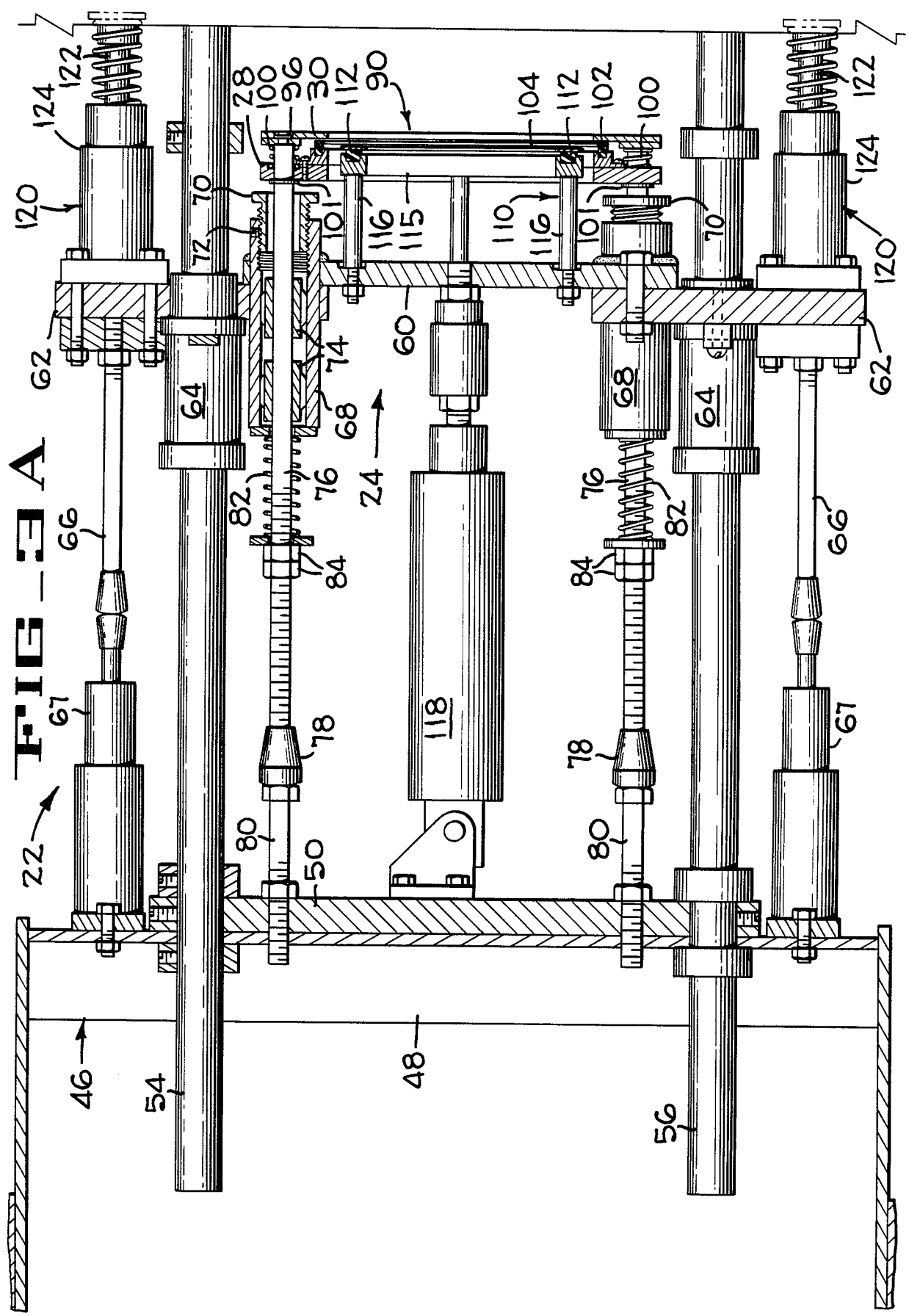

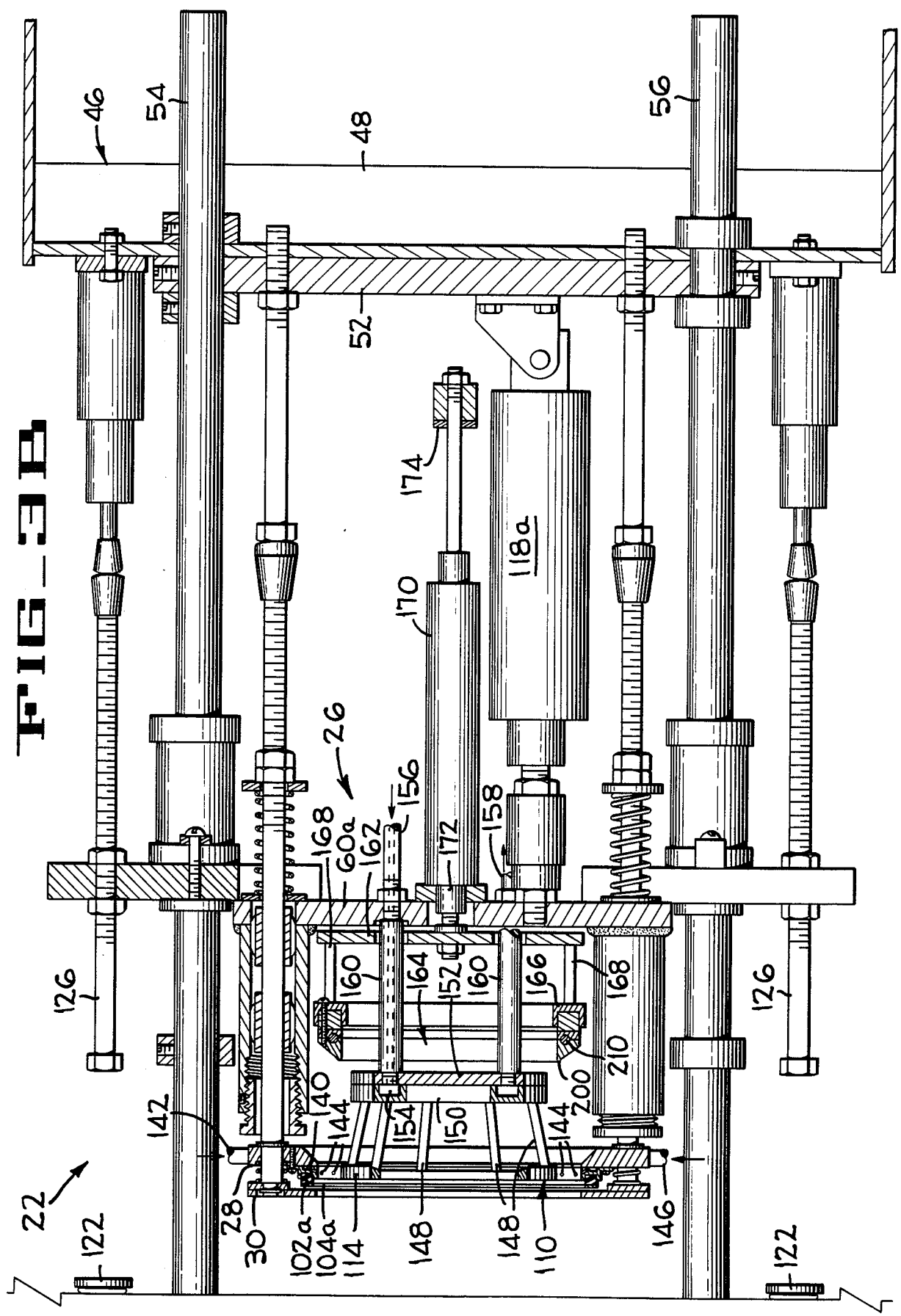

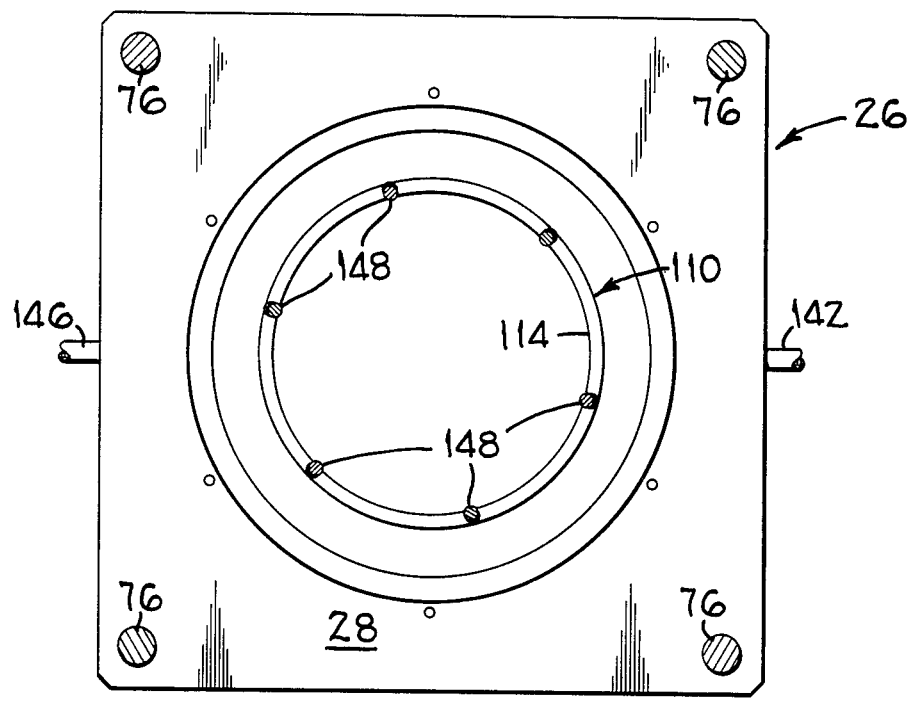
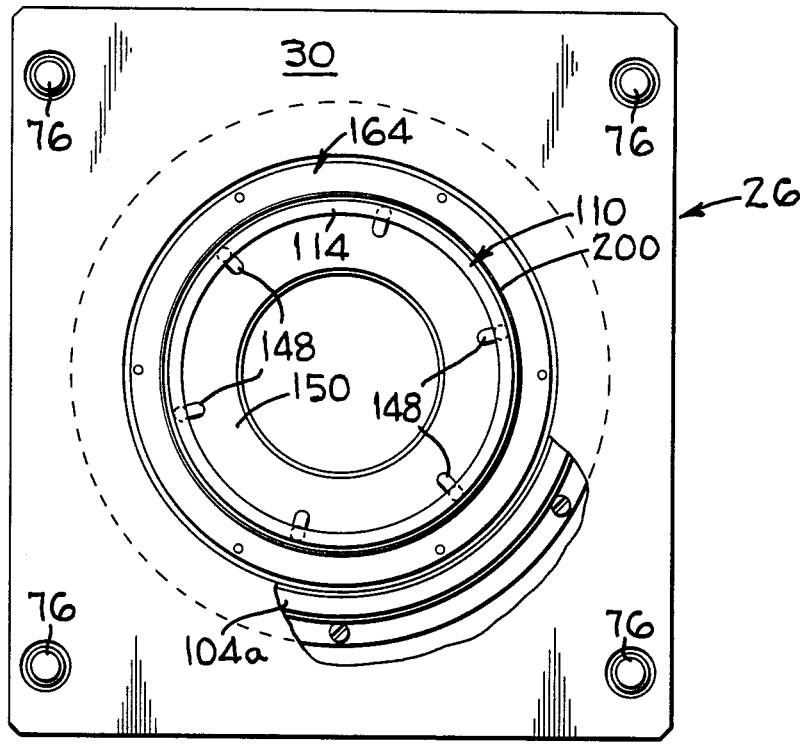
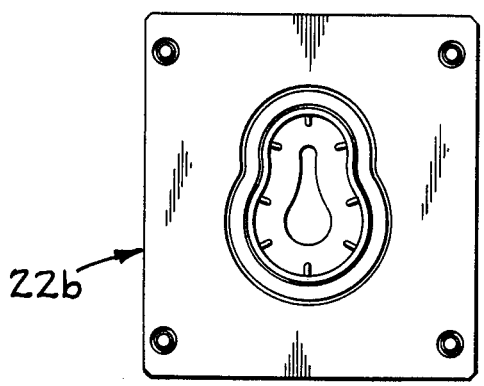

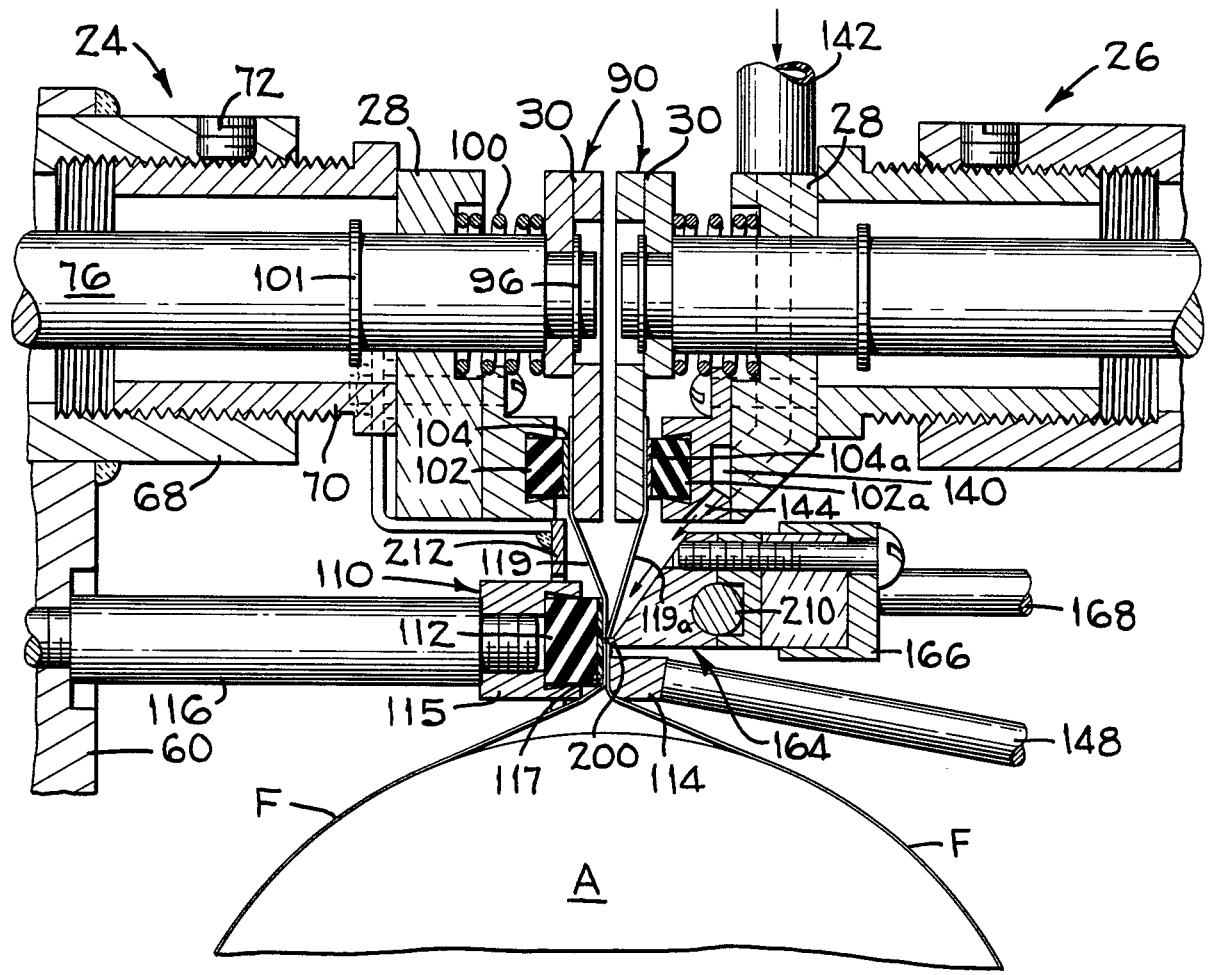
FIG_6
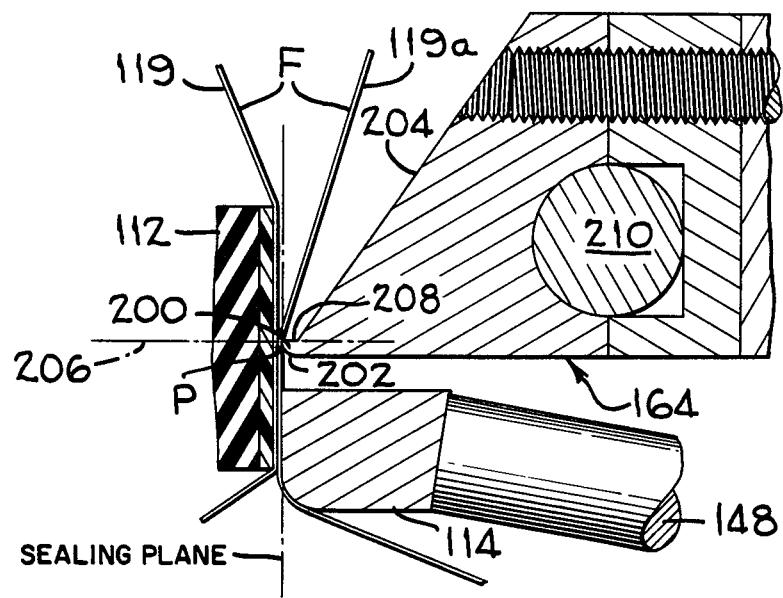
FIG_6A

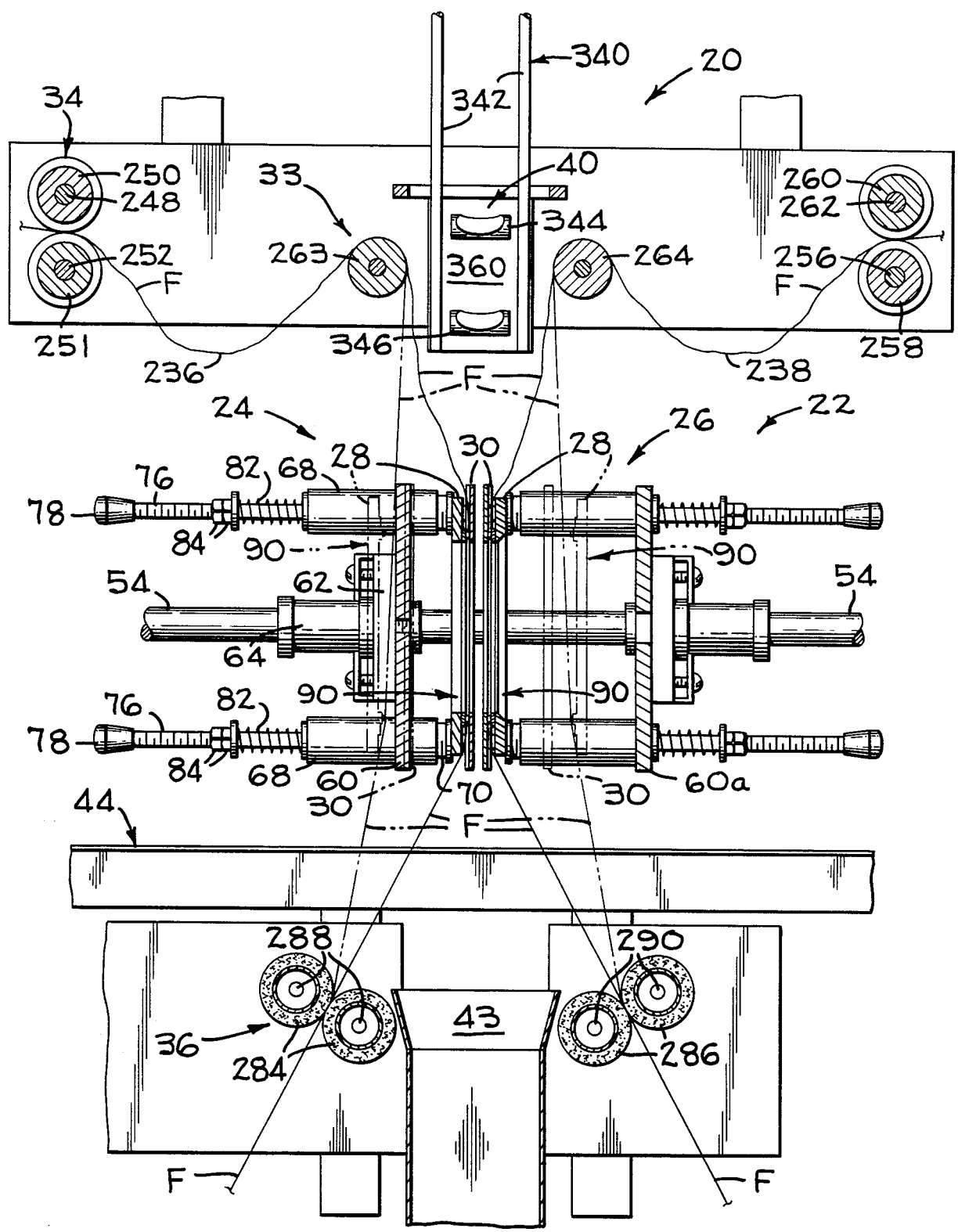
FIG_8

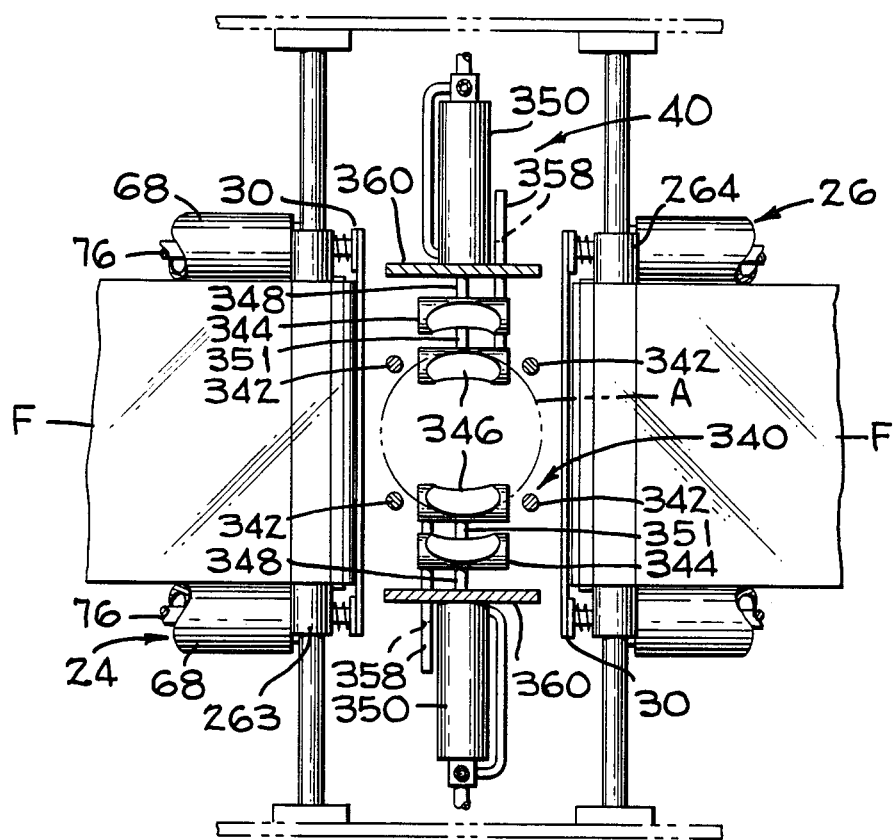
FIG_9
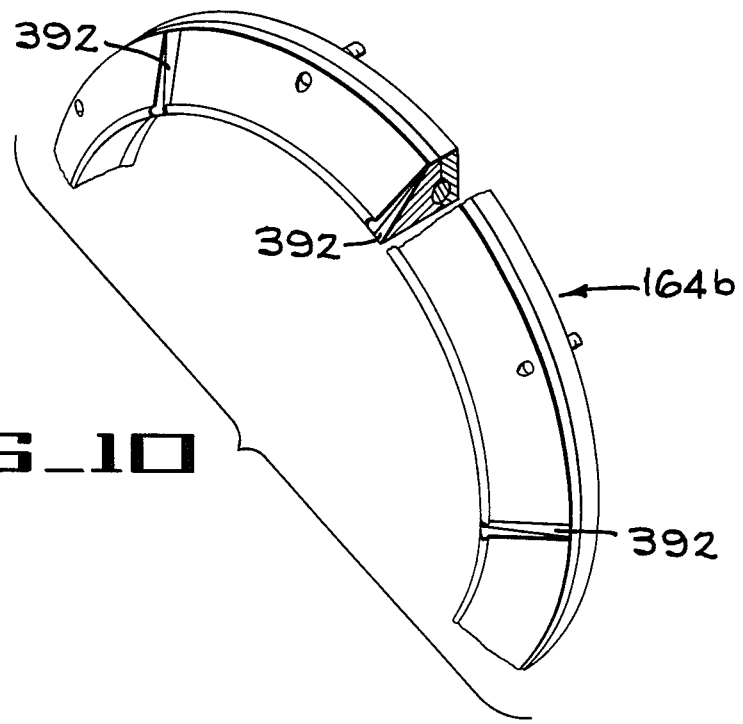
FIG_10

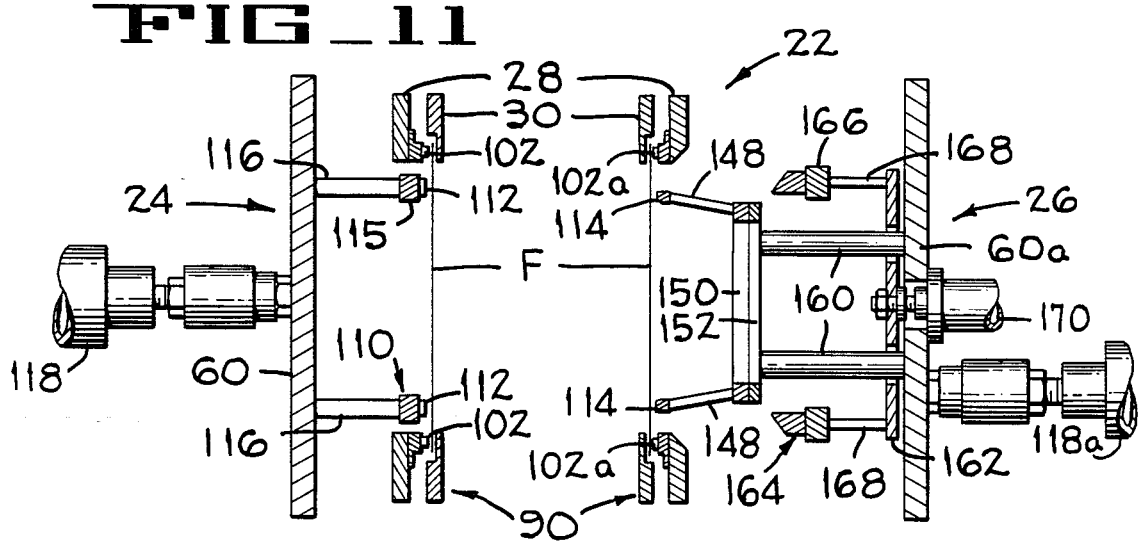
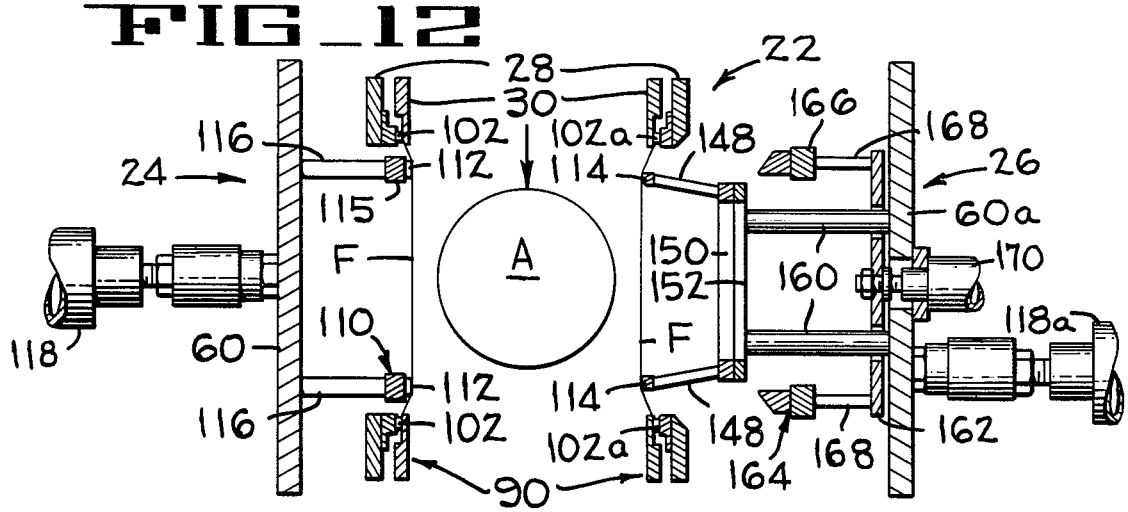
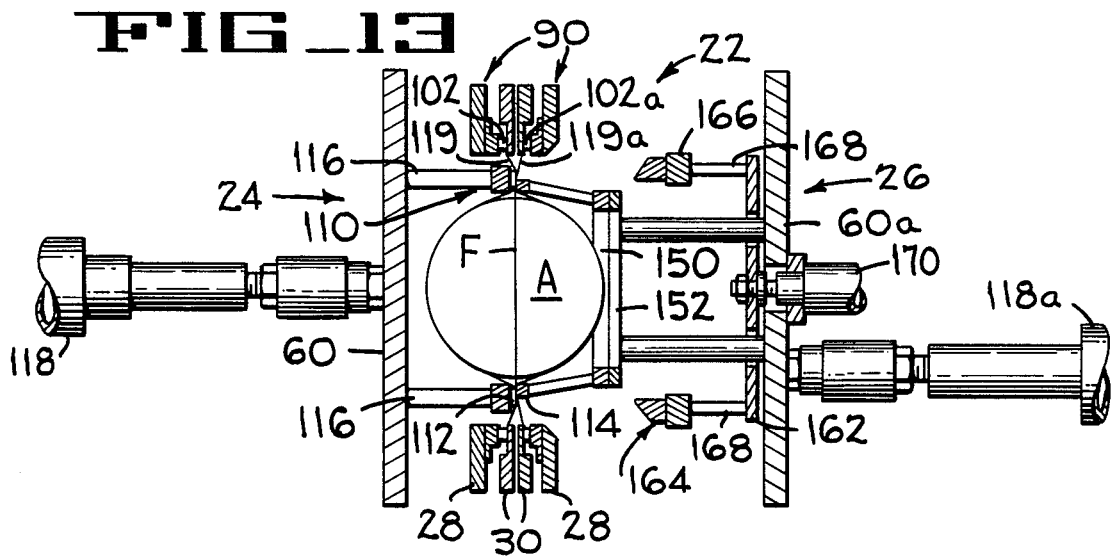

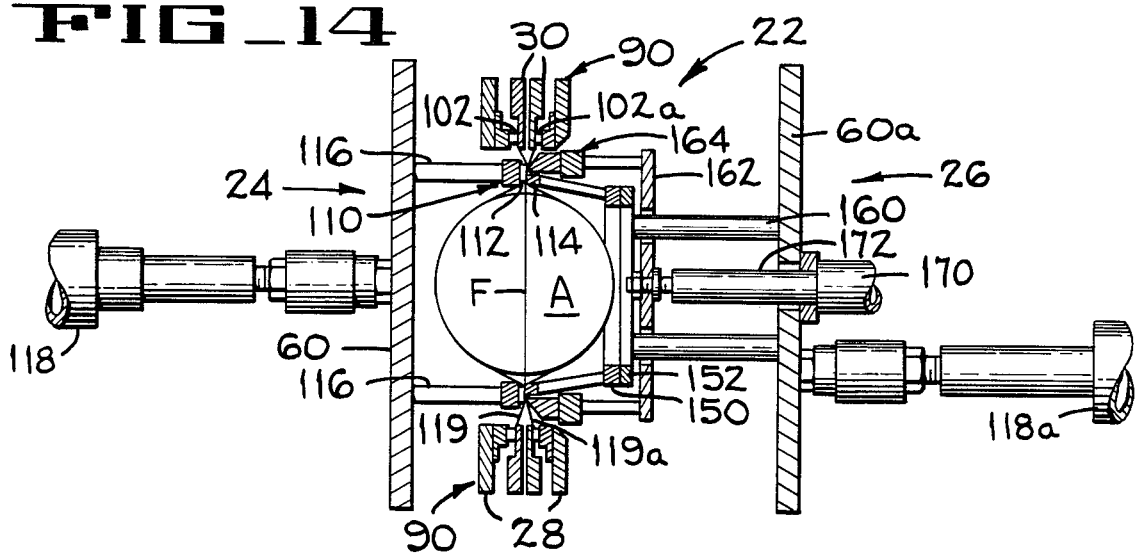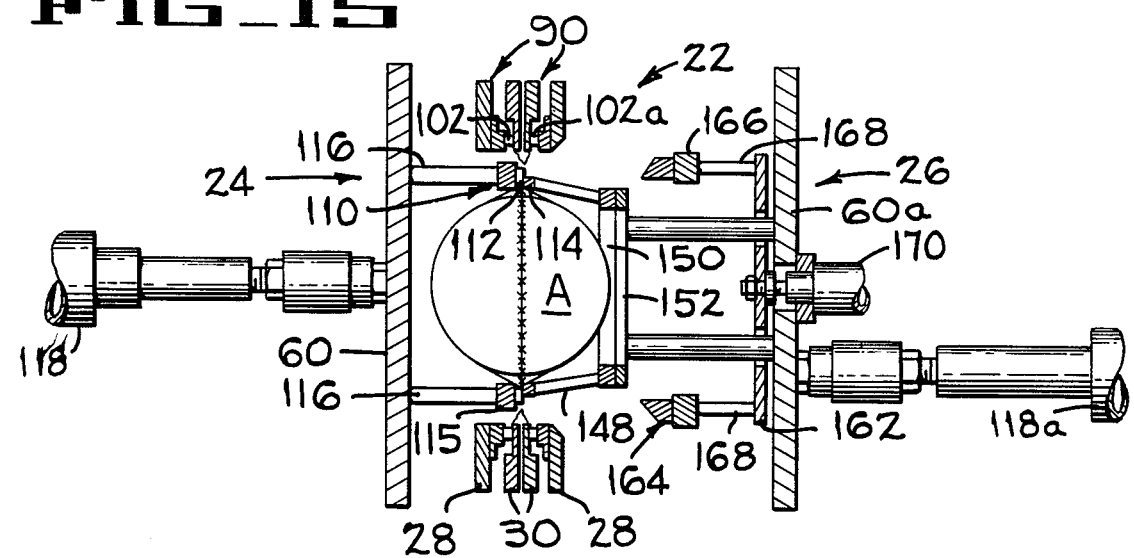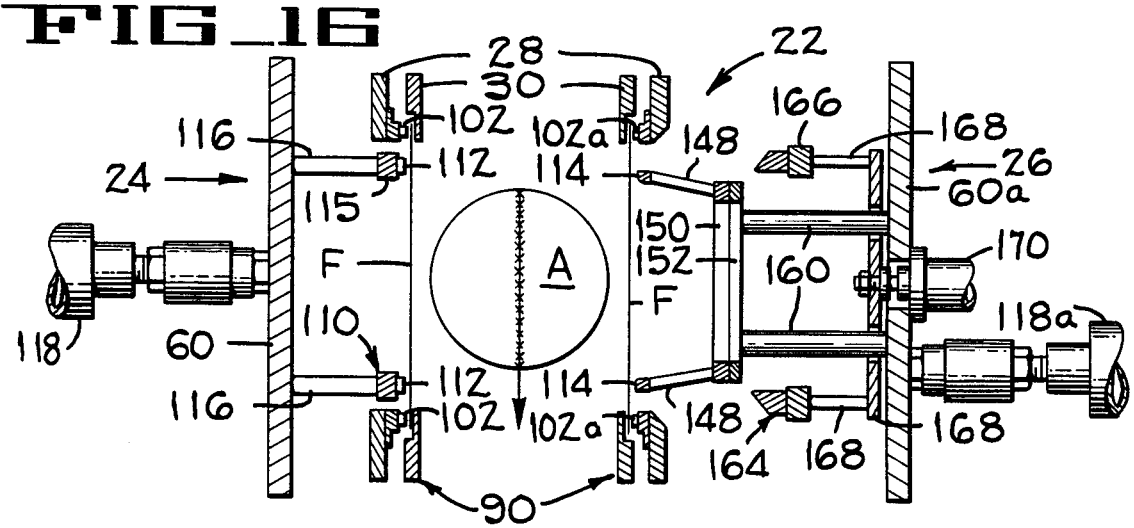

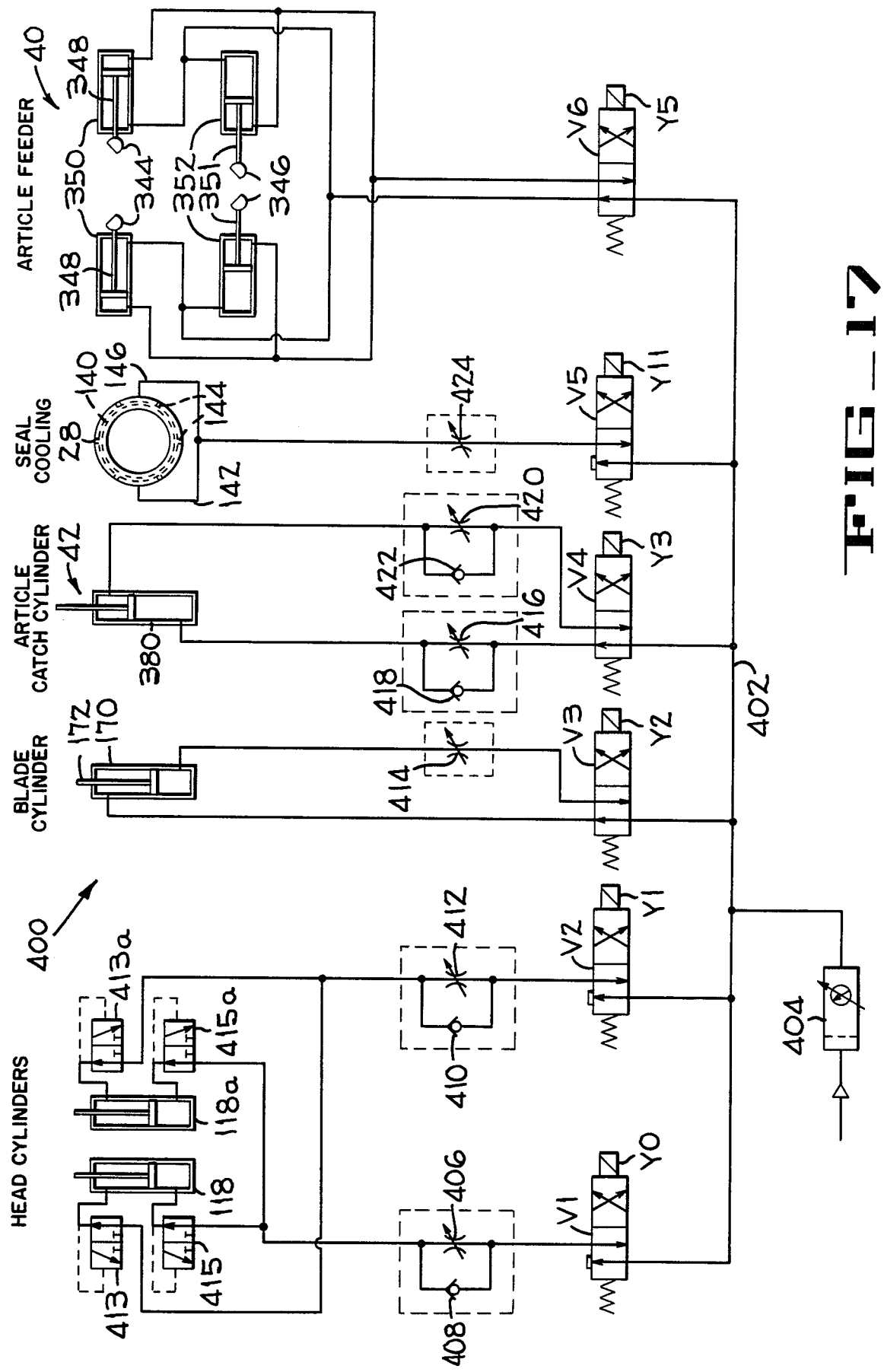
FIG_17

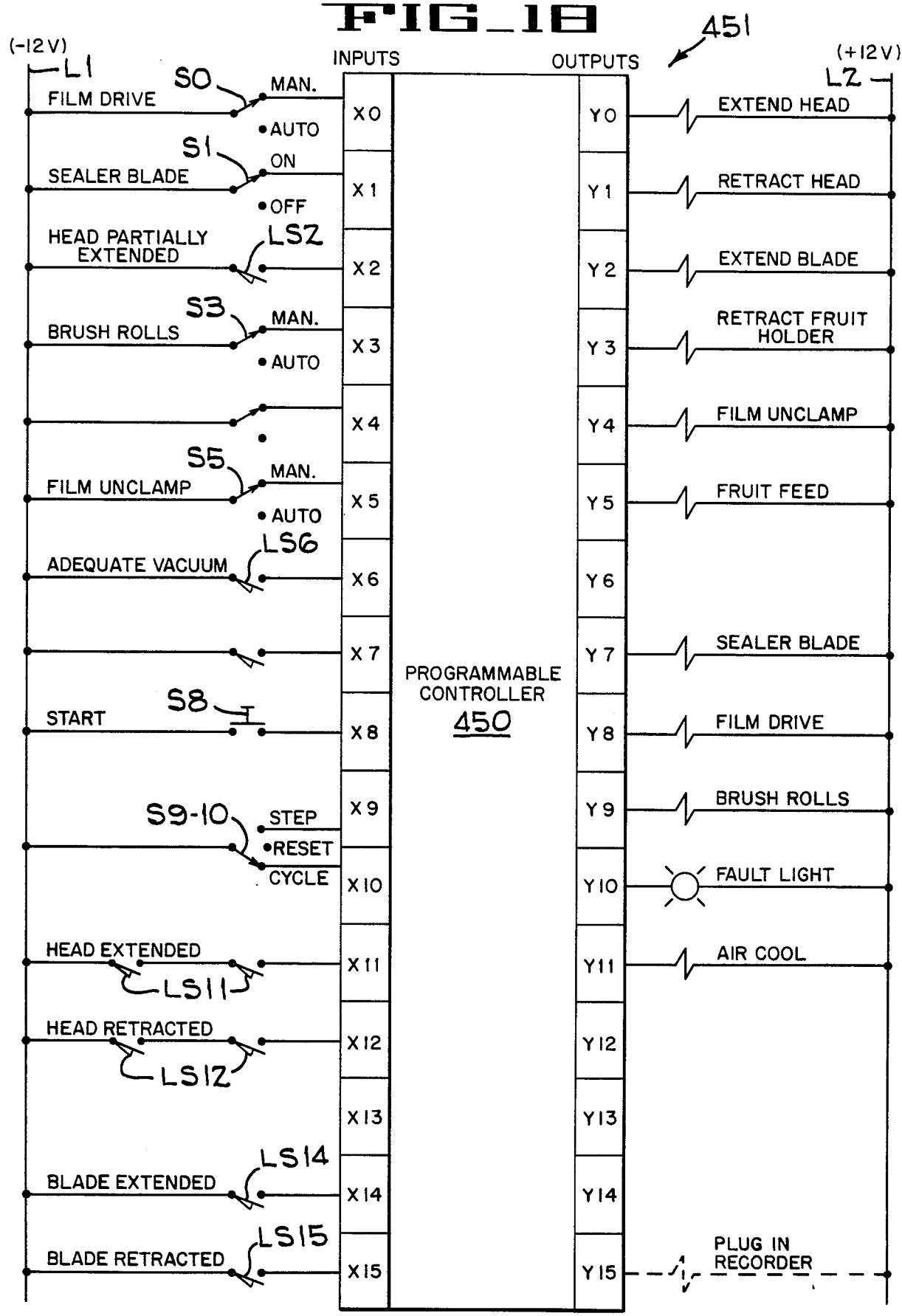

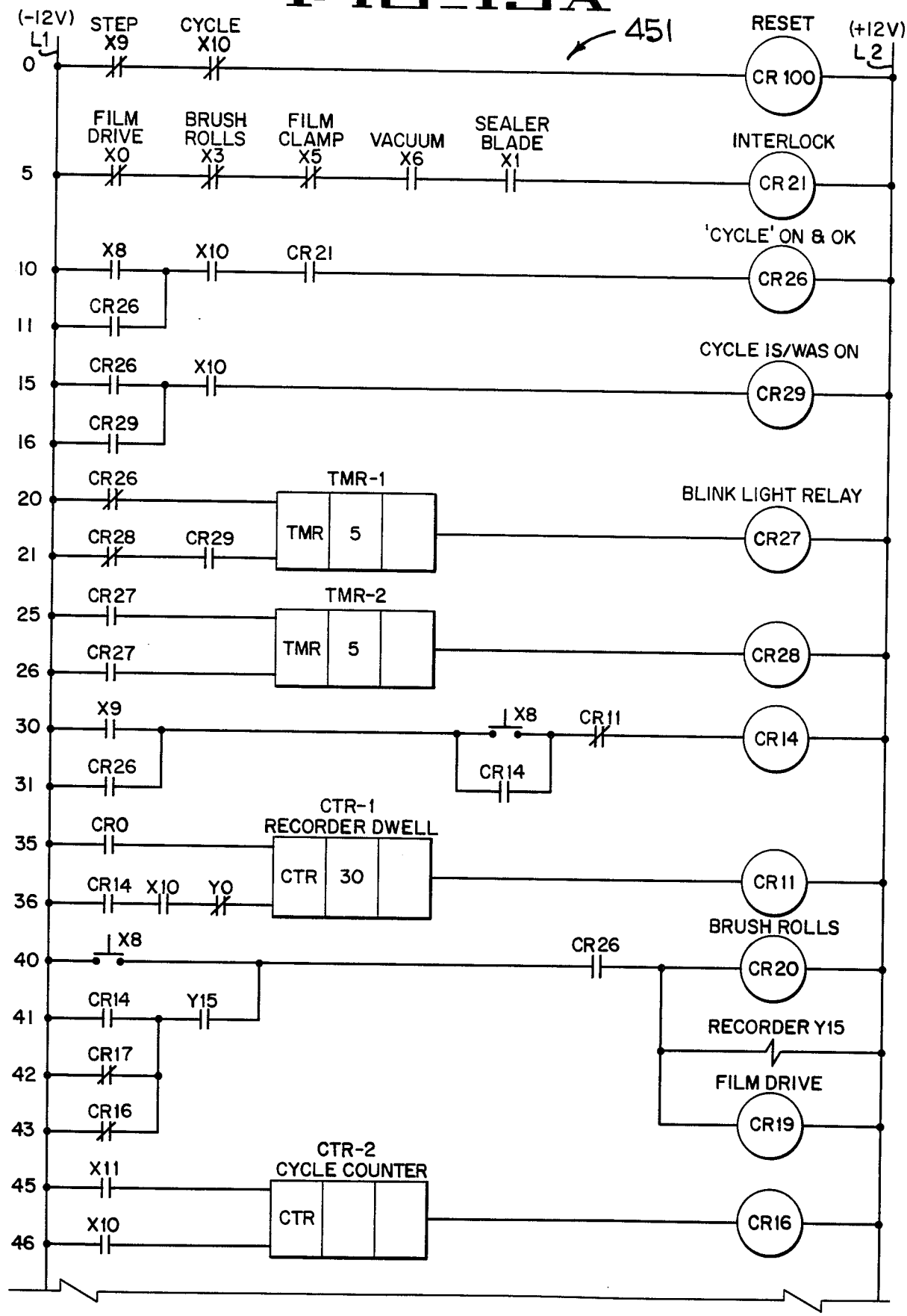

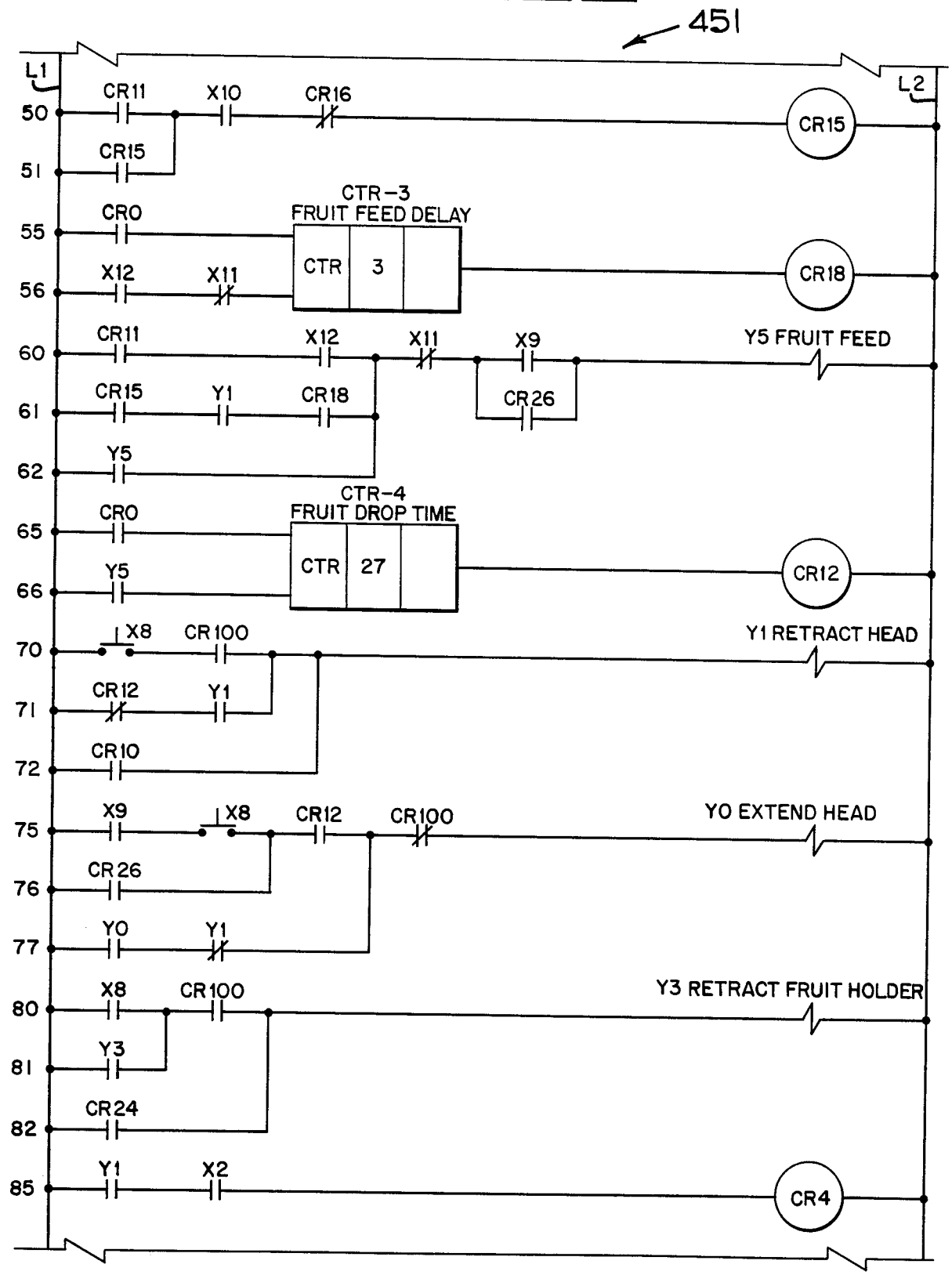

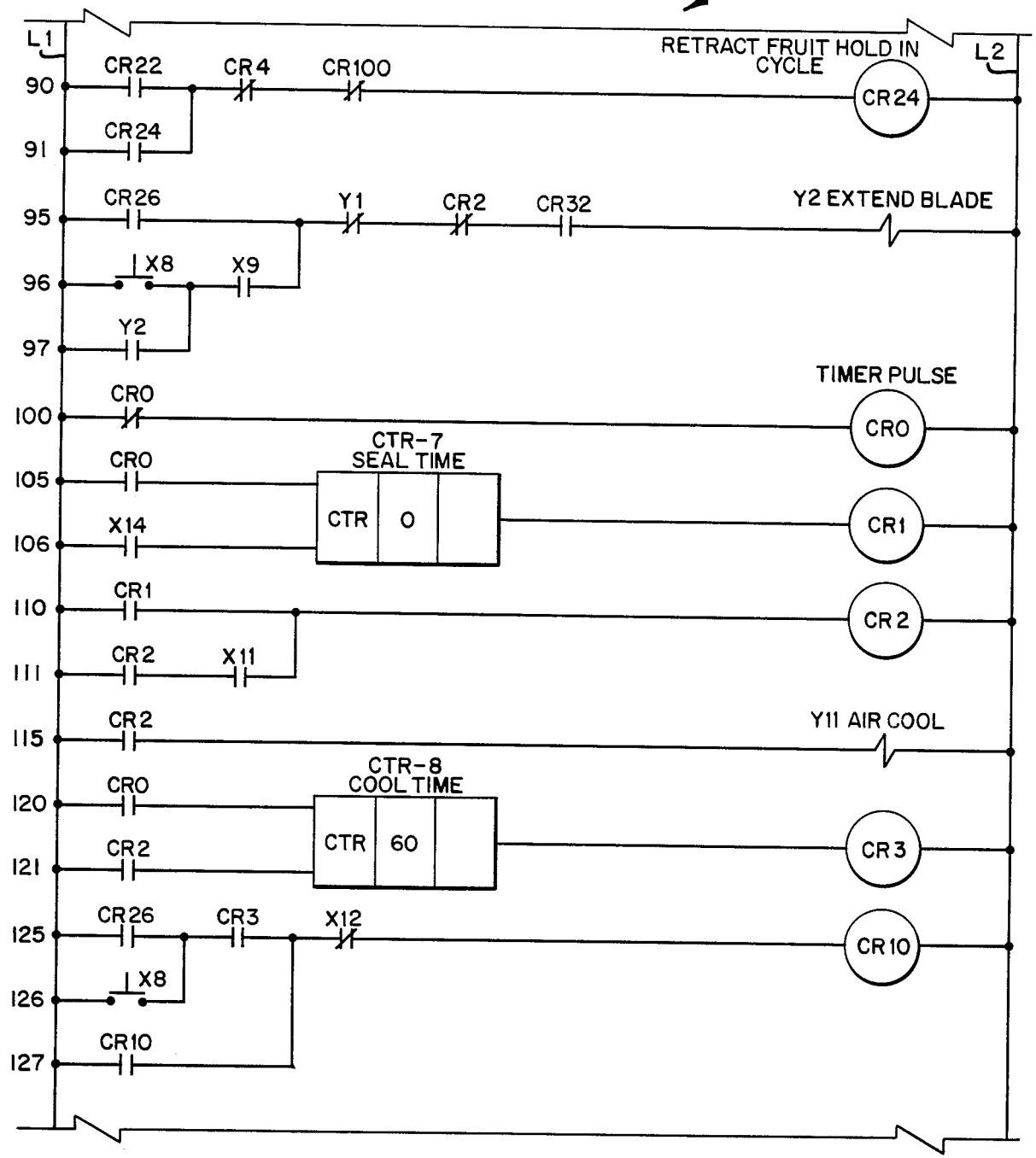
FIG_19C

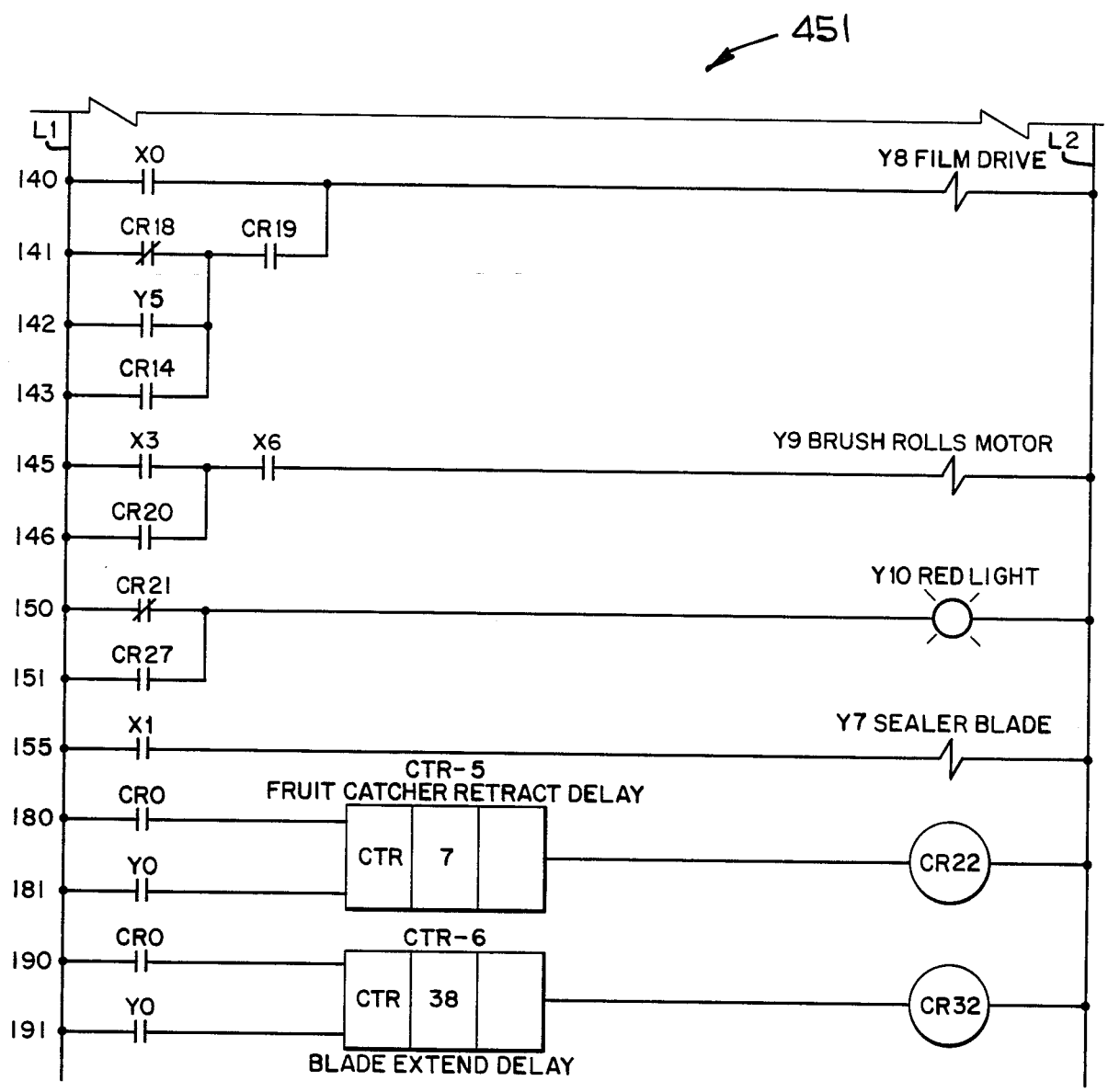
FIG_19D

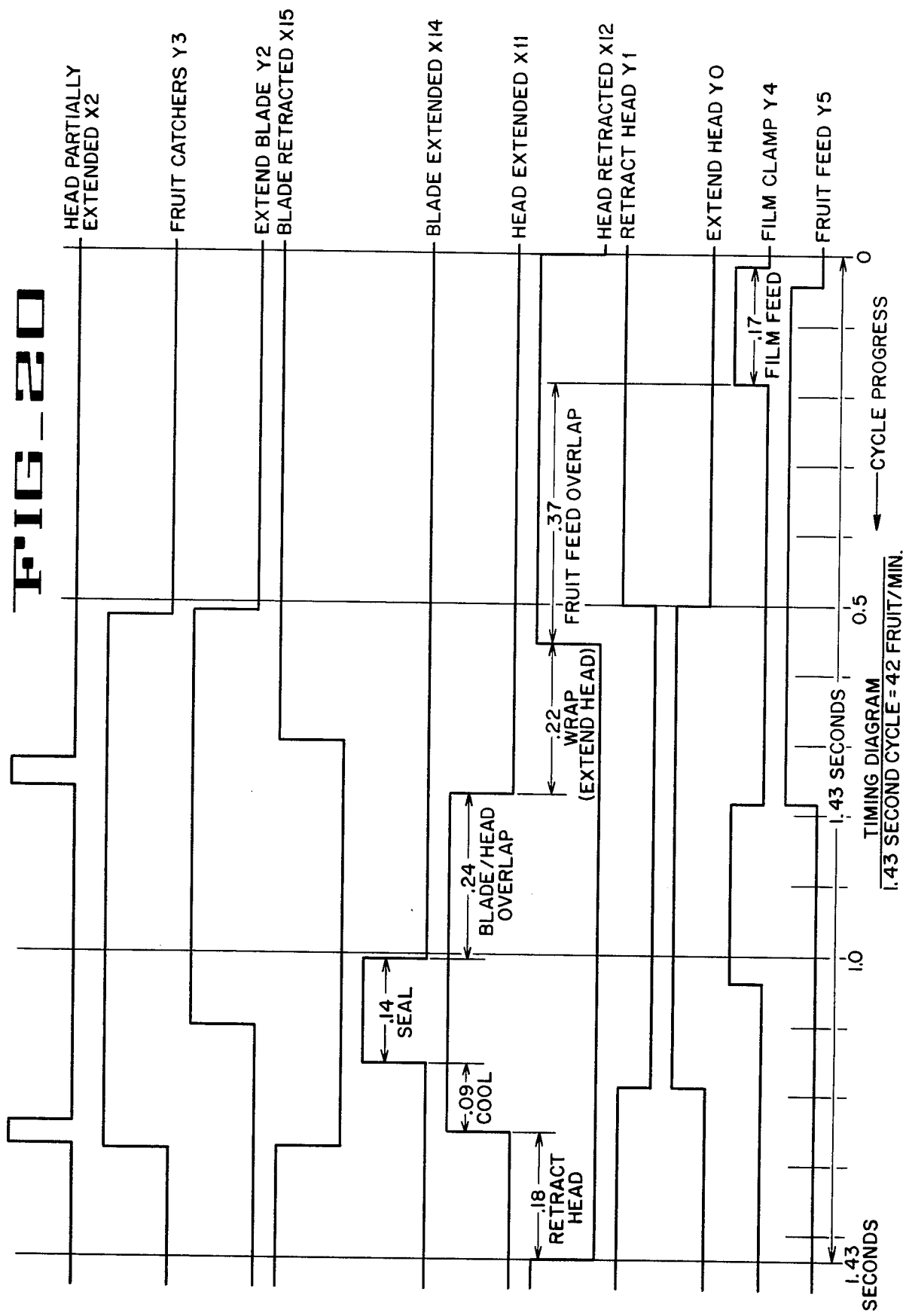

METHOD AND APPARATUS FOR PACKAGING ARTICLES SUCH AS FRUIT

CROSS REFERENCE TO RELATED APPLICATION

The present invention is similar to Kreamer application Ser. No. 418,118 entitled Improvements In Method And Apparatus For Packaging Articles Such As Fruit and filed on even date herewith.

BACKGROUND OF THE INVENTION

1. Field of the Invention

The present invention relates to a packaged article as an article of manufacture, and a method and apparatus for packaging an article in a stretchable container. More particularly, the invention relates to a method and apparatus for packaging perishable living articles such as fresh fruit or vegetables in a stretchable wrapper for reducing moisture migration from the article while permitting gases such as oxygen and carbon dioxide to diffuse into and out of the package.

2. Description of the Prior Art

Packaging or wrapping an article between strips of stretchable wrapping material and thereafter heat sealing the strips together enabling the film to stretch tightly over the articles is broadly known in the art. U.S. patents such as Salfisberg U.S. Pat. No. 2,141,318; Vaughan U.S. Pat. No. 3,381,444 and Grasvoll U.S. Pat. No. 3,933,569 are representative of such systems.

It is also broadly old to shrink wrap articles within plastic films which are heated, either before or after heat sealing, to soften the film causing the film to shrink and tightly conform to the shape of the article. U.S. patents such as Pfeiffer U.S. Pat. No. 2,486,759; Nicolle U.S. Pat. No. 2,494,484 and Horsky U.S. Pat. No. 3,851,440 are representative of this type of packaging.

It is recognized that fruit and vegetables or the like are living articles which live, after being severed from the plant, since they maintain life on the sugars and the like stored in the article itself. The metabolic activity of the article at this time is known as catabolism. Catabolism is a process which breaks down the food products from the living article to sustain life of the article while elminating water from the article due to chemical activities. Thus, catabolism reduces the food value of the living article, while any means which will retard the selfdestruction of the catabolistic process maintains the desirable food elements in the living article for longer periods of time.

It is known that freshly harvested fruits and vegetables contain many vitamins and minerals needed by humans for good health and growth. It is also known that packaging such articles as soon as possible after harvest in a manner which reduces moisture loss, but permits oxygen to enter the package and carbon dioxide to exit the package at relatively slow rates will maintain the fruit in a fresh state for longer periods of time.

SUMMARY OF THE INVENTION

In accordance with the present invention a method and apparatus is disclosed for packaging an article, preferably a living article such as fresh fruit or vegetables, within a package formed from film that is sealed together about the article for improving the shelf life of the atticle. The preferred film is a relatively inexpensive film which is stretched about the article without heating before or after being thermosealed about the article. The preferred film when formed into a package about the living article protects the article by minimizing moisture migration from the article, and by allowing the fruit to breathe in oxygen and expel carbon dioxide by diffusion through the film. A film such as a 0.4–0.7 mil EVA (ethylene vinyl acetate) stretch film which is a copolymer of low density polyethylene has been found to be satisfactory when packaging individual grapefruit at the rate of 30 per minute.

When the packaged article is a living article such as grapfruit for example, it is believed that the inclusion of a fungicide within the package reacts with the moisture on the article and thus requires about one third of the amount of fungicide compared to articles not packaged since the permeable film maintains a high humidity level in the package. The fungicide may be sprayed on the fruit prior to packaging, may be sprayed on the film prior to packaging or may possibly be incorporated in the film itself. One such fungicide is Imazalil made by Jansen Company of New Brunswick, NJ.

When packaging an article such as grapefruit, flattening of the article is minimized because the moisture retained in fruit maintains fruit turgidity, and because of the slower aging of the living article. Also, when a plurality of packaged grapefruit or the like are placed in a container, the spread of infection from one package within the container to another is greatly minimized in comparison to unpackaged fruit.

As used in the specification and claims, it will be understood that the term "living article" is an article that undergoes the catabolistic process. "Living article" as used herein includes individual fruit or vegetables of generally spherical configuration such as grapefruit, apples, peaches, tomatoes and the like; and also includes individual or groups of cylindrical or non-cylindrical fruit or vegetables. In addition, "living articles" includes articles of non-spherical configuration such as pears, avocados, bananas and potatoes.

It will be understood, however, that the articles to be packaged are not limited to "living articles" but may include other articles such as cheese, eggs, meat or the like which deteriorate during storage. Also, the article may be an inanimate article which merely becomes dusty or unattractive when stored in an unwrapped condition for a substantial period of time.

The term "annulus" as used in the specification and claims includes circular as well as noncircular configurations which surround and substantially conform to the shape of the single article or plurality of articles being packaged as a unit. It will be understood that the term "article" is broad enough to cover living articles as well as inert articles.

BRIEF DESCRIPTION OF THE DRAWINGS

FIG. 1 is a front elevation of the stretch wrapper of the present invention illustrating the location of the major components of the wrapper.

FIG. 2 is a side elevation of the apparatus looking in the direction of arrows 2—2 of FIG. 1.

FIGS. 3A and 3B when combined form an sealing mechanism taken along lines 3A-3B of FIG. 1, said mechanism being illustrated in an article and film receiving position.

FIG. 4 is an enlarged transverse section taken along lines 4—4 of FIG. 1.

FIG. 5 is an enlarged elevation looking in the direction of arrows 5—5 in FIG. 1 illustrating concentric components of one of the packaging heads, certain portions being cut away.

FIG. 5A is an elevation similar to FIG. 5 but taken at a smaller scale and illustrating non-circular annular portions of a packaging head which is adapted to handle a pear.

FIG. 6 is an enlarged horizontal section illustrating a portion of both heads in film clamping sealing and severing position with the film stretched around a portion of an article.

FIG. 6A is an enlarged cross-section through the hot knife illustrating the preferred shape of the knife, said knife being in its sealing and severing position.

FIG. 8 is a diagrammatic operational view illustrating the operation of the low inertia film advancing mechanism of the present invention.

FIG. 9 is a horizontal section taken along lines 9—9 of FIG. 1 illustrating the article feed mechanism.

FIG. 10 is a perspective with parts cut away of a modified form of hot knife which provides small openings in the bead seal to allow air to escape from the package when tightly engaging the article.

FIGS. 11-16 are operational views illustrating the package forming heads in progressive operative positions.

FIG. 17 is a pneumatic diagram illustrating a pneumatic circuit for operating the several components of the stretch wrapper.

FIG. 18 is an electrical diagram illustrating the input functions and output functions of a programmable controller.

FIGS. 19A-19D is a diagrammatic representation of an electrical control circuit including components of the controller and components externally of the controller.

FIG. 20 is a timing diagram taken during a diagnostic check with a strip chart recorder when the wrapper was set to operate at 42 fruit per minute (1.43 seconds per cycle).

DESCRIPTION OF THE PREFERRED EMBODIMENT

Figure 7:
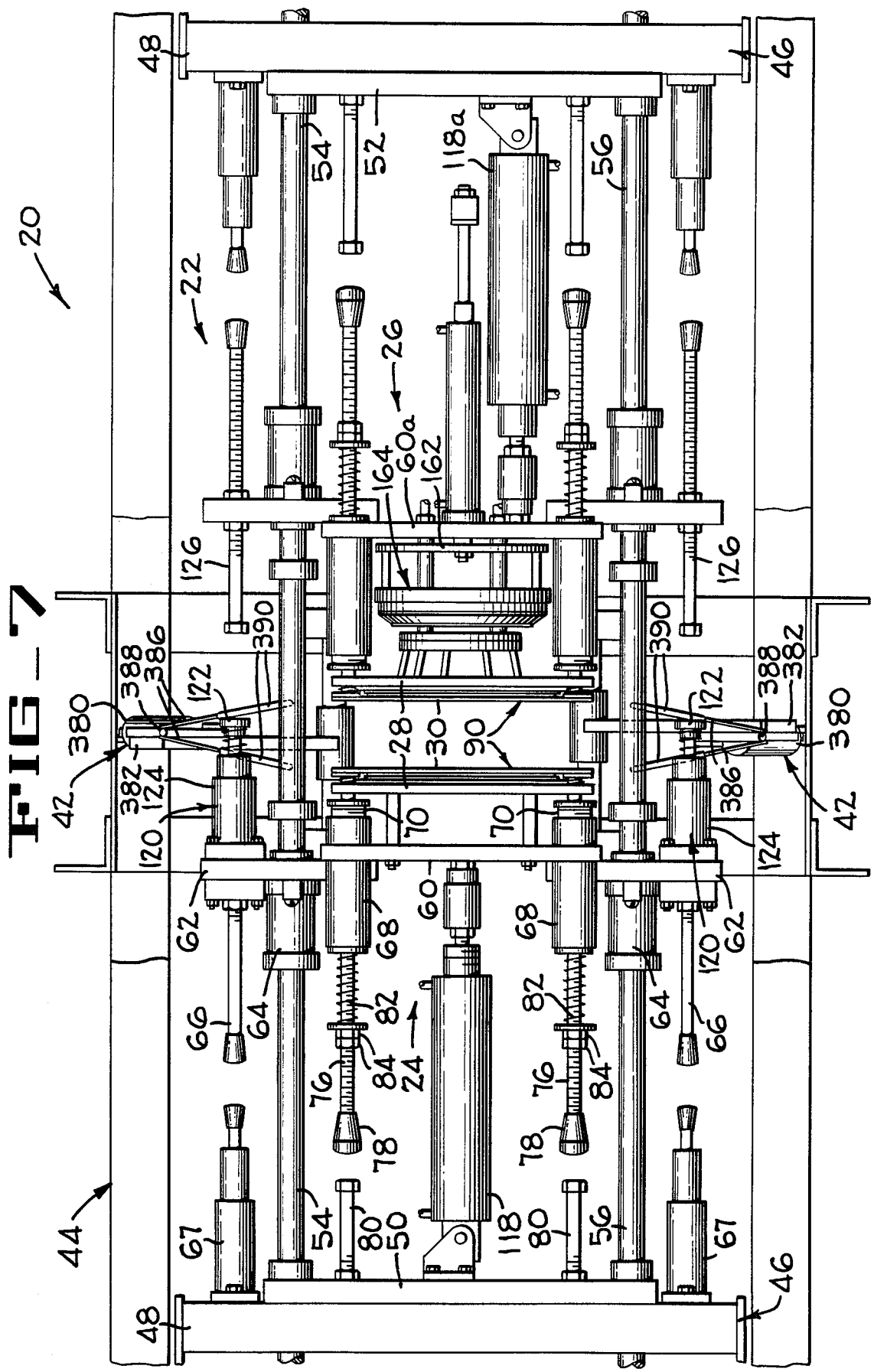
FIG. 7 is an enlarged diagrammatic horizontal section taken along lines 7—7 of FIG. 1 illustrating the packaging heads in an intermediate position in clamping engagement with the film strips.

In general, the article packaging mechanism or stretch wrapper 20 (FIGS. 1 and 2) of the present invention includes a package forming and sealing mechanism 22 defined by two packaging heads 24,26. Each packaging head 24,26 includes a pair of outer film clamping annuluses 28,30 which capture portions of the film strips F pulled therebetween by a low inertia film drive system 33 (FIG. 8) which includes an upper film drive mechanism 34 that cooperates with a lower film drive mechanism 36 to intermittently advance the film strips F off associated feed rolls 38 with the film remnant being fed downwardly out of the wrapper for subsequent collection and sale as scrap film. An article feed mechanism 40 directs articles A (FIGS. 2 and 9) one at a time between film portions captured by each head 24,26. The article is received by a catch assembly 42 (FIGS. 1, 2 and 7) which gently receives and holds the article in sealing position. As the packaging heads 24,26 are extended to seal the article within the captured film portions and then severs the resulting package from the scrap film, the catch assembly 42 moves out of catching position. The packaged article is released in response to retraction of the packaging heads and is received by discharge means such as a discharge chute 43 and takeaway conveyor (not shown). The above components are all supported by the main frame 44.

The package forming and sealing mechanism 22 (FIGS. 1-3A,3B) includes a sub-frame 46 that is supported on the main frame 44 by end brackets 48 (FIG. 1). The sub-frame 46 include end support plates 50,52 bolted to the adjacent brackets and drilled to receive a pair of spaced head supporting shafts 54,56 (FIGS. 3A and 3B) that are rigidly secured to the plates 50,52. As indicated in FIGS. 3A and 3B, the shafts 54,56 are oriented in a horizontal plane and slidably support the packaging heads 24,26.

The packaging head 24 (FIG. 3A) comprises a mounting plate 60 which is bolted to bearing plates 62 with bushings 64 rigidly secured thereto and slidably receiving the associated support shafts 54,56. Each bearing plate also carries a stop bolt 66 screwed therein and locked in position by a locknut When in the illustrated aritlce receiving position, the stop bolt 66 engages a standard well known shock absorber 67.

Four sleeves 68 (one being shown in section in FIG. 3A) are welded to the mounting plate 60 near its corners and have adjustment nuts 70 screwed in one end thereof and locked in adjusted position by a soft tipped set screw 72 or the like. Ball bushings 74 in each sleeve 68 slidably receives a rod 76 which extends completely through and projects outwardly from both ends of the associated sleeve 68 and the adjustment nut 70. One end of each rod 76 has a resilient cap 78 secured thereto for cushioning engagement with an adjustable stop bolt 80 that is secured to the support plate 52 when the packaging head 24 is in the position shown in FIG. 3A. A spring 82 on each rod 76 is disposed between the associated sleeve 68 and locknuts 84 screwed on the rod 76. The pair of outer film clamping annuluses 28,30 (FIG. 6) of the head 24 defines an outer film clamp generally designated 90. The annulus 28 of head 24 is slidably supported on the inner end portions of the four rods 76, and the annulus 30 is connected to a reduced diameter portion of each rod 76 by snap rings 96. The annuluses 28,30 are urged apart by a spring 100 on each rod 76, and the maximum amount of separation is limited by snap rings 101 secured to each rod 76 as shown in FIG. 3A. However, when the heads 24 and 26 are in film clamping position as illustrated in FIG. 6, the annulus 28 bears against the adjustment nuts 70, which nuts are axially adjustable for shifting the film clamping planes of the outer clamps 90 relative to other components of the packaging heads 24,26.

The annulus 28 includes a resilient clamping pad 102 faced by a thin metal strip 104 to prevent sticking of the film to the pad after the two cooperating annuluses 28,30 have been separated by the springs 100 as shown in FIG. 3A.

It will be appreciated that the springs 82 (FIG. 3A) will urge the associated annuluses 28,30 in clamping engagement against a film strip F therebetween after the resilient heads 22,24 have moved toward each other to separate the resilient caps 78 from the bolts 80 as shown in FIG. 7 thereby overcoming the annulus separating force exerted by the springs 100.

An inner film clamp 110 is provided for clamping the two film strips F together inwardly of the captured portion for isolating annular strips of film so that the isolated film will be under relatively low tension compared to the portion of the film stretched around the article thereby permitting sealing and severing under relatively low tension. The inner film clamp 110 includes a resilient annulus 112 on the sealing head 24 and a cooperating annulus 114 on the sealing head 26.

The resilient annulus 112 is secured to the mounting plate 60 by a ring 115 and a plurality of shouldered studs 116 (FIG. 3A) and cooperating nuts. The resilient annulus 112 is covered by Teflon tape 117 or the like to prevent the film F from sticking thereto. The studs 116 are sized to position the resilient annulus 112 a sufficient distance from the mounting plate 60 to prevent the film from contacting either the mounting plate 60 or the annulus supporting components when the film is stretched around the article to be packaged as shown in FIGS. 13, 14 and 15.

Power means such as an air cylinder 118 (FIG. 3A) is connected between the end support plate 50 and the mounting plate 60 for moving the packaging head 24 between the film feed position shown in FIGS. 3A and 3B and the film feed sealing position best illustrated in FIGS. 13 and 14. When in the film sealing position, the adjustable nuts 70 (FIG. 6) associated with the four rods 76 may be screwed into or out of the associated sleeves 68 to vary the angle of an isolated film annulus 119 of the associated film strip F relative to the clamping surfaces or plane of the inner annuluses 112,114 and the outer annuluses 28,30 of the head 24. Thus, adjustment of the nuts 70 of the head 24 will provide the optimum angle of the associated isolated film portions 119 for best sealing. It is apparent that equivalent parts of the other head may be adjusted in the same way.

Since many of the components of the packaging head 26 are the same as those described in connection with the packaging head 24, only the differences will be described, and equivalent components of the head 26 will be assigned by the same numerals used to describe the head 24 followed by the letter "a".

The packaging head 26 (FIGS. 3B and 6) includes the mounting plate 60a (FIG. 3B) which is connected to the previously mentioned end support plate 52 by an air cylinder 118a for moving the head 26 simultaneously with the head 24 between the article feed position illustrated in FIG. 1 and the film sealing position illustrated in FIGS. 13 and 14. The packaging head 26 also includes a resilient clamping pad 102a (FIG. 6) and film contacting metal strip 104a.

As previously mentioned, the bearing plates 62 (FIG. 3A) of the packaging head 24 are slidably received on the support shafts 54,56. Each plate has a standard well known cushioning assembly or damper 120 secured thereto. Each damper includes a cushioned plunger 122 slidably received in a cylinder 124 for reducing impact and for slowing inward movement of the two packaging heads 24 and 26. Each plunger 122 contacts an adjustable stop bolt 126 (FIG. 3B) during the last approximately 1 inch of travel into their sealing positions.

The annulus 28 of the packaging head 26 differs from the equivalent part of the head 24 in that it is air cooled and includes an annular air cooling passage 140 (FIGS. 3B and 6) formed therein. Cooling air from an air pump (not shown) is directed through inlet conduits 142 and 146 with a portion being discharged from the annular passage through a plurality of radial passages 144. The cooling air from the passages 144 is directed against the film strips F to cool the film strips after they have been sealed together about the article A.

The inner annulus 114 (FIGS. 3B, 4 and 5) of the inner film clamp 110 includes a plurality of spider legs 148 which connect the annulus 114 to a pair of plates 150,152 (FIG. 3B) that are secured together and are provided with a coolant passage 154 therein. Although cooling may not be required at low speeds, if cooling is required at higher speeds, cooling air or water from a conduit 156 is directed through the passage 154 and subsequently discharges the cooling fluid through a conduit 158. The plates 150,152 are rigidly connected to the mounting plate 60a by a plurality of shouldered bolts 160 or the like which extend through holes in a hot knife mounting plate 162. The hot knife mounting plate 162 is carried by and reciprocates with the mounting plate 60a in response to actuation of the air cylinder 118a, and is also reciprocated relative to the plate 60a as will be described hereinafter.

Since the outer clamping means 28,30 (FIG. 1) of the packaging heads 24,26 firmly clamp and isolate portions of the film strips that are parallel to each other, it will be apparent that the central portions of the captured film will initially contact the articles. These central portions of the captured film will tend to cling to the article and accordingly will stretch very little. Since these central portions stretch very portion prior to moving the film into the packaging machine 20 without requiring the use of distorted printing techniques.

An electrically heated hot knife 164 (FIGS. 3B and 6) is mounted on a ring 166 in a conventional manner and is connected to the mounting plate 162 by a plurality of spaced legs 168. An air cylinder 170 is secured to the mounting plate 60a and has a piston rod 172 therein that is connected to the plate 162. A resilient bumper 174 is adjustably mounted on the piston rod to limit depth of penetration into pad 112 by knife 164 when the knife 164 is moved between the inactive position of FIG. 3B and the active sealing and severing position illustrated in FIGS. 6 and 14 at which time the isolated portions 119,119a (FIG. 6) of the captured film are urged against the resilient annulus 112 of the sealing head 24 for heat sealing and severing the film as clearly shown in FIG. 6.

It will be appreciated that it is undesirable to seal the outer or scrap portions of the two film strips together after severing the article packaging portions from the film. It will also be apparent that it is desirable to provide a strong seal between the two captured film portions of the strips which form the package.

Accordingly, as best illustrated in FIGS. 6 and 6A the shape of the annular hot knife 164 in cross section is such that the film engaging annular tip 200 (FIG. 6A) of the knife 164 will form a puddle P of plastic on the annular inner (or package forming side) of the contacted film strips F while providing very little puddling on the outer or scrap side of the film. It has been found that providing an inner surface 202 of arcuate cross section having a radius within the range of about 0.005 to 0.060, preferably about 0.045, will provide a desirable puddling of molten film on the package side of the film. It has also been determined that a good seal is provided if the outer surface 204 of the tip 200 is at an angle of about 50° relative to a reference line 206 which passes through the center of the inner arcuate surface 202 and is normal to the film strips F. The surface 204 and the reference line 206 preferably intersect to provide an outer annular edge 208 that is normal to the sealing plane illustrated in FIG. 6A.

The relatively flat angle of the outer surface 204 assures sufficient heat migration from a standard heating element 210 in the hot knife 164 to assure proper heating of the arcuate surface without cooling during operation of the stretch wrapper 20.

It will be understood that many conditions such as sealer penetration, knife profile, resilient material, and others may be changed to provide means to achieve variable conditions to suit various films and provide strong or weak seals as required by the specific sealing application.

As shown in FIG. 5, the film clamping surfaces and the hot knife 164 of the heat 26 are of circular configuration. FIG. 5A illustrates that it is within the scope of the invention to provide a packaging head 22b having sealing and severing surfaces of non-circular shape, such as the illustrated pear-shaped surfaces.

As shown in FIG. 6, a film stripping annulus 212 may be secured to the annulus 28 to assure that the film 119 severed by the hot knife 164 is stripped from the Teflon strip 117 in response to movement of the clamp 110 back to the fruit-receiving position of FIG. 3A.

The low inertia film drive system 33 (FIGS. 1 and 8) is designed to provide continuous film advancing forces to each film strip at a location above the sealing and severing heads 24,26 and also at a location below the heads 24, 26. The film driving forces above the heads form loops 236, 238 of film when the film is clamped from movement by the heads 24,26 when in the solid line position of FIG. 8, at which time the lower film drive mechanism 36 slips relative to the film F. When the heads 24 and 26 are moved to their article receiving positions and the outer film clamps 90 of heads 24,26 are released as illustrated in dotted lines in FIG. 8, the lower film drive mechanism 36 pulls the film strips F downwardly thereby removing (or substantially removing) the film loops 236,238 each time the film strips are advanced. Thus, the only inertia to be overcome during film feed is that induced by the weight of the accelerated portions of the film strips F.

The upper film drive mechanism 34 comprises a motor 240 (FIG. 1) connected to a pair of drive sprockets 242,244 by an endless chain 246. The sprocket 242 is keyed to a shaft 248 journaled in the frame 44 having a resilient film engaging drive roller 250 thereon. One film strip F is disposed in driving engagement between the roller 250 and an associated idler roller 251, which idler roller is secured to a shaft 252 journaled in the frame.

The drive sprocket 244 is similarly secured to a shaft 256 having a resilient feed roller 258 secured thereto and cooperating with an idler roll 260 on a shaft 262 which continuously drives the other film strip F as illustrated in FIG. 1. The two film strips F are trained around idler rollers 263,264 (FIG. 8) and are trained between the associated outer clamping annuluses 28,30 of the packaging heads 24,26.

The lower film drive mechanism 36 (FIGS. 1 and 8) receive the scrap film with the package forming portions of the film removed therefrom. The mechanism 36 includes two pair of film drive rollers 284,286 mounted on shafts 288, 290 journaled on the frame 44. The film engaging surface of each pair of rollers 284,286 is relatively soft so that the cooperating pairs of rollers will engage the film F with sufficient force to rapidly pull the film through the associated packaging heads 24,26 when the heads are in the article receiving position of FIG. 1, but will slip over the film without damaging the film when the heads 24,26 are in clamping engagement with the film. The surface of the rollers 284 and 286 is similar to that of well known paint rollers.

In the event low profile articles are to be tightly wrapped, the film may be prestretched prior to clamping the film between the associated outer annuluses 28,30 (FIG. 8). This may be accomplished in several ways for example by replacing the soft rollers 284,286 by harder rollers.

The pairs of rollers are driven at relatively high speed by a motor 292 and endless chain 294 trained around roller drive sprockets 296,298 that are secured to the shafts 288,290 and around idler sprockets 302 journaled on the frame.

The article feed mechanism 40 as best illustrated in FIGS. 2, 8 and 9 is designed to feed a spherical article, such as grapefruit, one at a time between the packaging heads 24 and 26. A conveyor or the like (not shown) directs a single row of articles A into an upright article guide or magazine 340. The magazine 340 is defined by four bars 342 (FIG. 9) which extend downwardly to a point immediately above the packaging heads 24,26. In order to feed one article at a time into the heads 24,26, an upper pair of article singulating gates 344 and a lower pair of gates 346 are alternately opened and closed in timed relation with the movement of the heads 24,26.

The upper and lower gates 344,346 (FIGS. 8 and 9) each includes an article supporting plate which is contoured to conform to the engaged surface of the article. Each upper gate 344 (FIG. 2) is secured to the piston rod 348 of an associated upper air cylinder 350. Similarly, piston rods 351 of lower air cylinders 352 support the lower gates 346. The gates are each maintained in article supporting position by a guide pin 358 (FIG. 9) secured thereto and slidably received in a hole in an associated mounting bracket 360 secured to the frame 44.

Each article A when fed by the article feed mechanism 40 into the sealing heads 24,26, is gently received by the catch assembly 42 (FIGS. 2 and 7) which holds the article in centered position relative to the packaging heads 24,26 until the captured film portions are partially stretched over the article and maintain control of the article. The catch assembly 42 is then retracted.

As best shown in FIGS. 2 and 7, the catch assembly 42 comprises a pair of air cylinders 380 each connected between the frame 44 and an arm 382 pivoted at 384 to the frame 44. An article catching wing assembly 386 is secured to the upper end of the associated arm 382. Each wing assembly 386 comprises a pair of wings (FIG. 7) connected together by a hinge 388 and urged outwardly by a spring (not shown). As illustrated in solid lines in FIG. 7, the wings are pivotally spread apart to substantially cradle an article received from the feed mechanism 40 when the package forming heads 24,26 are in article receiving position. When the heads 24,26 are moved toward each other in package forming position, the wings 398 are contacted by the heads and pivot toward each other in order to fit between the heads. Each wing preferably includes a shock absorbing article engaging surface 390 such as a resilient bead or rubber tubing for minimizing damage to an article A such as fruit.

As shown in FIG. 2, the arms 382 and wing assemblies 386 are in their article catching position. At this time the lower gates 346 will open. When the article drops into the catch wings 386, the shock absorbing article engaging surface 390 minimizes damage to articles such as fruit or vegetables. The wings 386 catch and center the article relative to the heads 24,26 to minimize unequal stretching and resultant tearing of the film.

After the captured portions of the film in the package forming heads 24,26 gain control of the article, the air cylinders 380 are retracted to move the wing assembly 386 of the catch assembly 42 outwardly away from the film strips F and article thereby allowing the article A to be gripped by the film and packaged. The packaged article thereafter drops into the chute 43 for removal by a discharge conveyor or the like (not shown).

FIG. 10 illustrates a fragment of a modified hot knife 164b which is the same as the knife 164 (FIG. 7) except that a plurality of narrow radial grooves 392 are formed in the sealing edge of the knife 164b for cutting but not sealing the two film strips together. The grooves are preferably about 1/16th of an inch wide, and provide narrow unsealed portions of film for more rapidly expelling air from the package immediately after the package has been formed.

A pneumatic diagram 400 for the several air operated components of the stretch wrapper 20 is illustrated in FIG. 17. High pressure air from a source (not shown) enters main conduit 402 through a filter regulator 404. The packaging head cylinders 118,118a are extended and receive high pressure air through a spring return solenoid operated valve V. The valve VI is illustrated as being in its parallel passage position which blocks flow of high pressure air therepast. When a solenoid Y0 is energized, high pressure air flows through a cross passage in valve V1, through an adjustable speed control valve 406, and is blocked from flow by a check valve 408 that is disposed in a parallel circuit with the flow control valve 406. The high pressure air then enters the closed end of cylinders 118, 118a thereby moving the packaging heads 24,26 from their article receiving positions of FIG. 11 to their packaging positions of FIG. 13. Air is then discharged from the rod end of the air cylinders 118,118a through cross-passages in pilot operated quick-exhaust valves 413,413a. The valves 413,413a are spring urged into the illustrated positions by springs and are shifted to the exhaust position by high pressure in the piston ends of their associated cylinders.

When it is desired to retract the cylinder 118, 118a, solenoid Y0 is de-energized returning valve V1 to its illustrated parallel passage position, and solenoid Y1 is energized shifting the valve V2 to its cross passage position. High pressure air is then directed through a speed control valve 412, that is in parallel with the check valve 410, and enters the rod ends of the cylinders 118,118a thereby retracting the cylinders with the air in the piston ends thereof being discharged through pilot operated quick-exhaust valves 415,415a.

The hot knife or blade cylinder 170 is held in retracted position by air flowing through parallel passages in a valve V3 when the solenoid Y2 is deenergized. When retracting the cylinder 170, air is discharged from the piston end thereof through a speed control valve 414 and a parallel passage in valve V3. When the solenoid Y2 is energized, valve V3 is shifted to its cross passage position thereby extending the piston rod of cylinder 170 and moving the hot knife 164 from the FIG. 13 position to the FIG. 14 position.

The article catcher 42 is controlled by valve V4 actuated by a solenoid Y3. When the solenoid is deenergized, high pressure air flows through a parallel passage in the valve V4, a speed control valve 416, and into the piston end of the air cylinders 380 (only one being shown) to extend the piston rods and move the article catcher to its operative position. Air is discharged from the rod end of the cylinders 380, flows through a check valve 418 and flows through a parallel passage in the valve V4. When the solenoid Y3 is energized, high pressure air flows through a cross passage in valve V4, through a speed control valve 420 into the rod ends of the cylinders 380 thereby retracting the piston rods to move the catcher 42 into its inoperative position shown in FIG. 7. Air is discharged from the rod ends of the cylinders 380 through a check valve 422 and a cross passage in valve V4.

The cooling air supply for cooling the seal bead is controlled by a valve V5 operated by a solenoid Y11. When in its illustrated de-energized position, high pressure air is blocked from flow past valve V5. When the solenoid Y11 is energized, the valve V5 is shifted to cross passage position directing high pressure air through a speed control valve 424 and into the annular passage 140 in the annulus 28 for flow out of ports 144 against the film seal to cool the same.

The four cylinders 350,352 of the article feeder are controlled by a valve V6 which is spring loaded into the illustrated parallel passage position and is shifted to the cross passage position by energization of the solenoid Y5. Flow of high pressure air through a parallel passage of the valve simultaneously enters the piston ends of the cylinders 352 thus closing the lower gates 346; and enters the open ends of the cylinders 350 thus opening the upper gates 344. At this time low pressure air is directed out of the other ends of the cylinders 350,352 through the other parallel passage valve V6. Energization of solenoid Y5 directs high pressure air into the piston ends of the cylinders 350 to close the upper gates 344; and into the rod ends of the cylinders 352 to open the lower gates 346 and feed an article onto the article catcher 42.

The several components of the article packaging machine 20 are controlled by a programmable controller 450 (FIG. 18), which controller is preferably a Texas Instruments Model 5T1-1010 programmer which is manufactured by Texas Instruments Inc., 34 Forest, Attleboro, MA 02703.

An electrical circuit 451 (FIGS. 18,19A-19D) diagrammatically illustrates the electrical components of the packaging machine 20 including the controller components; and will be described in conjunction with the functions performed by the machine.

The circuit 451 is connected between −2 V main line L1 and +12 V main line L2. FIG. 18 illustrates a plurality of switches connected to selected inputs X0-X15 of the controller 450; and a plurality of solenoids and a light connected to selected outputs Y0-Y15 of the controller. The functions of the several electrical components are also given.

FIGS. 19A-19D represent the internal functions performed by the controller 450 in combination with other electrical components of the machine 20. For convenience in locating the several electrical components, the lines in which the components are located are numbered adjacent the main line L1 in FIGS. 19A-19D.

To aid in identifying the several electrical components in FIGS. 19A-19D, it will be noted that the controller "inputs" are identified by X0-X15; the controller "outputs" are identified by Y0-Y15; and the several switches are identified by S followed by the numeral assigned to the corresponding controller input. The contacts associated with the several controller inputs and outputs are identified by X and Y respectfully, plus the corresponding number; while the contacts CR of the corresponding control relays CR will be followed by the numerals assigned to the associated relays.

When a three position switch S9-10 (FIG. 18) is at "reset", normally closed contacts X9 and X10 (FIG. 19A-line 0) are closed thereby energizing reset control relay CR100. Thus, the reset terminal of switch S9-10 (FIG. 18) allows the controllers to treat it as an input even though there is no physical signal from the switch position. When switch S9-10 is positioned on "step" or "cycle" contacts X9 or X10 (line 0) opens thus de-energizing relay CR100.

In order to operate the packaging machine 20 so that it automatically makes a plurality of cycles, the three way switch S9-10; along with switches S0, S3, and S5 (FIG. 18) are placed in the "auto" or "cycle" mode. Power is then directed to input X10.

Having reference to line 5 (FIG. 19A), the interlock control relay CR21 is energized when film drive contact X0, brush roll contact X3, and film clamp contact X5 have been closed by placing the associated switches on "auto"; vacuum actuated switch LS6 closes when adequate vacuum is present thus closing vacuum contact X6; sealing blade contact X1 is closed by placing switch S1 to the "on" position. More particularly, vacuum contact X6 is closed by closing vacuum switch LS6 (FIG. 18) in response to the film scrap vacuum being adequate (about 0.8 inches of water). When CR21 is energized red fault light Y10 (line 150) is off since normally closed contact CR21 is opened.

Closing start switch S8 (FIG. 18) will energize control relay 26 (line 10) which latches itself, i.e., closes CR26 (line 11) thereby providing a holding circuit across contact X8. Contacts X10 and CR21 are closed at this time since three way switch S9-10 (FIG. 18) is at "cycle" (input 10), and relay CR21 (line 5) is energized. If any one of the interlock component (line 5) opens, CR21 is de-energized thus de-energizing CR26. For example, if the vacuum interlock component X6 opens due to insufficient vacuum, CR26 will not reenergize until the vacuum condition is corrected closing X6 and energizing relay CR21 which closes contact CR21 (line 10); and start switch S8 is manually closed again thereby closing contact X8 (line 10). Thus, operator action is required to restart the machine 20 for automatic operation.

Lines 15-26 provide a protective warning/diagnostic function by flashing red light Y10 (line 150) when one or more of the five functions in line 5 has changed state and when the three way switch S9-10 is on "cycle". Light Y10 (line 150) is "off" when the interlocks (in line 5) are operating properly; the light Y10 is "on" when an interlock is not operating properly; and the light Y10 blinks "on" and "off" when the interlock changes and then corrects itself. CR26, when energized, closes relay contact CR26 (line 15) thus energizing relay CR29 (line 15) through closed contact X10 which closes contact CR29 (line 16) thereby latching itself. Energized relay CR29 also enables a timer TMR-1 (line 21) by closing contact CR29 which will not time until CR26 is de-energized due to a bad interlock. In response to a bad interlock, timing is started and after 5 counts of 0.1 second (½ second) it will energize CR27. CR27 turns on fault light Y10 (line 150) and starts a timer TMR-2 (lines 25, 26) by closing both contacts CR27 (lines 25-26). Closing the lower contact CR27 (line 26) enables the timer TMR-2, while closing the upper contact CR27 (line 25) initiates the timer; duration of the timed interval is the count set on timer TMR-1 (0.5 seconds). After five counts (0.5 seconds) CR28 is energized which opens contact CR28 (line 21) and turns off timer TMR-1, which in turn de-energizes relay CR27 opening contact CR27 (line 26) thereby de-energizing timer TMR-2 which deenergizes relay CR28 closing contact CR28 (line 21) which resets timer TMR-1 turning on blink light relay CR27 after 0.5 seconds. Thus, the blink light relay CR27 (line 20) alternately closes and opens contact CR27 (line 151) which turns light Y10 on and off every half second until the three position switch S9-10 (FIG. 18) is switched out of "cycle".

Upon correcting the defective interlock component, the switch S9-10 is placed in "cycle" for continuous operation of the machine which occurs after start switch S8 is closed and relay CR26 is energized. Closing start switch contact X8 (line 30) energizes relay CR14 through closed contact CR26 and normally closed contact CR11. Energization of relay CR14 also closes contact CR14 (line 31) thereby latching start switch contact X8 after the start switch has been released. The "run" command is thus held until relay CR11 (line 35) is energized.

Closing "start" switch S8 (FIG. 18) also closes contact X8 (line 40) which is in series with closed contact CR26 thereby energizing relays CR20, CR19 and recorder solenoid Y15 (lines 40-43). Energization of relay CR20 closes contact CR20 (line 146) which cooperates with closed vacuum switch contact X6 to energize solenoid Y9 thereby driving the brush roll motor 240 (FIG. 1). Energizing the relay CR19 energizes the film drive solenoid Y8 (line 140) through closed contact CR19 and normally closed contact CR18 (line 141), thereby driving the film drive motor 240 (FIG. 1). Energization of recorder solenoid Y15 (line 41) starts an optional plug in strip chart recorder (not shown) for preparing timing diagrams such as shown in FIG. 20.

Energization of relay CR14 (line 30) also closes relay contact CR14 (line 36) thereby energizing dwell counter CTR-1 through previously closed contacts X10 and Y0 (line 36). The counter CTR-1 counts once each time timer pulse relay CR0 (line 100) is energized through normally closed relay contact CR0 (line 100), which occurs every 1/60th of a second thus alternately closing and opening contacts CR0 (line 35) and CR0 (line 100). The dwell counter CTR-1 counts 30 pulses (0.5 seconds) and then energizes relay CR11 (line 36). The 0.5 second dwell provided by the dwell timer CTR-1 assures that the brush roll motor, the film drive motor and the recorder motor are up to running speed before the machine actually begins wrapping Energization of relay CR11 (line 35) opens normally closed relay contact CR11 (line 30) thereby de-energizing relay CR14. Energization of recorder solenoid Y15 (lines 40-43) closes contact Y15 (line 41) which cooperates with either contact CR14, CR17, or CR16 to provide a holding or latching circuit across start switch contact X8 in line 40. When relay CR11 (line 35) is energized, it closes contact CR11 (line 50) thus energizing relay CR15 and closing contact CR15 (line 51) to latch CR15 (line 50). Control relay CR11 (line 35) is subsequently de-energized when contact Y0 (line 36) of extended head solenoid Y0 (FIG. 18) is energized.

A cycle counter CTR-2 (lines 45 and 46) is preset for the desired number of articles in a batch to be wrapped. The three way switch S9-10 (FIG. 18) when set in its "cycle" position closes contact X10 to enable the counter CTR-2. Head extended limit switch LS11 (FIG. 18) and contact X11 (line 45) alternately opens and closes thus making a count once each time the packaging heads are moved from their fully retracted to their fully extended positions. The count is made in response to cycling of the packaging heads 24,26 (FIG. 1) thereby alternately opening and closing limit switches LS11 (FIG. 18) and its contact X11 (line 45). When the preset number of articles is counted, relay CR16 (line 45) is energized opening relay contacts CR16 (line 43 and 50) thus de-energizing relay CR15 (line 50). With contact CR16 (line 43) open, CR20,CR19 and Y15 (lines 40–43) are de-energized when contact CR17 (line 42) is opened, which occurs at completion of the last wrap cycle, thereby stopping the motors for the brush rolls, film drive, and recorder.

The feeding of articles is controlled by energization of solenoid Y5 (lines 60–62) which controls the solenoid operated spring return valve V6 (FIG. 17) for activating the two pairs of article feed cylinders 350,352 so that the lowermost article drops between the packaging heads but the article above it are held up by closed gates 344. When the article feed is automatically cycling, contacts CR26 (line 61) are closed. X11 and X12 are alternately closed when the packaging heads are extended and retracted in response to the heads 24,26 closing limit switches LS11 and LS12, respectively. Thus, fruit feed occurs only when the packaging heads are retracted, i.e., when they are spaced from each other. Contact CR11 is closed at this time since recorder dwell relay CR11 (lines 35–36) remains energized. Contact Y5 (line 62) is closed when solenoid Y5 is energized and remains closed until the contact X11 opens in response to the packaging heads moving to their extended positions thereby closing switch LS11 (FIG. 18) and opening contact X11. All of the articles drop one space and are supported on the lower gates 346 (FIG. 17) when solenoid Y5 is de-energized by X11 (line 60) opening.

Energization of solenoid Y5 as above described also enables a fruit drop counter CTR-4 (lines 65–66) which makes 27 counts (27/60 seconds) for the fruit to drop before energizing control relay CR12. Once the counter CTR-4 is initiated, the count is controlled by the previously described timer pulse control relay CR0 (line 100).

Energization of relay CR12 energizes solenoid Y0 (line 75) of spring return air valve V1 (FIG. 17) thus shifting the valve to its cross passage position and extending the pistons of the air cylinders 118,118a to extend the packaging heads. Contact CR12 (line 71) opens to de-energize solenoid Y1 at air valve V2, etc., to allow heads to leave retracted position. Contact Y0 (line 77) latches solenoid Y0 when contact Y1 is closed, i.e., retract head solenoid Y1 (line 70) is deenergized. Contact CR100 (line 75) is closed at this time since CR100 (line 0) is de-energized because three way switch S9-10 is on "cycle" thereby opening contact X10. It is also noted that relay contact CR26 (line 76) is closed since the machine is in "cycle".

Control components of the fruit holder or article catch assembly 42 (FIGS. 2 and 17) are illustrated in lines 80–82. The catch assembly 42 as illustrated in FIG. 2 is in the article catching position for catching the articles released from the article feeder 40 as above described. After an article (referred to as fruit) has been dropped on the fruit holder and the packaging heads start to move inwardly around the fruit, the controller 450 extend head output solenoid Y0 (FIG. 18) closes contact Y0 (line 181) which activates a fruit catch retract delay counter CTR-5 which makes 7 counts (7/60 seconds) and then energizes relay CR22. The counter CTR-5 counts pulses from the timer pulse relay contact CR0 from timer pulse relay CR0 (line 100) as previously described.

Energization of relay CR22 (lines 180–181) energizes relay CR24 (line 90) through a circuit including closed contacts CR22, CR4 and CR100. Relay contact CR24 (line 91) closes to provide a latching circuit across CR22 (line 90). Energization of relay CR24 also closes contact CR24 (line 82) which energizes retract fruit catcher or holder solenoid Y3 (line 80) thereby shifting valve V4 (FIG. 17) which retracts cylinders 380 and thus pulls the catcher outwardly of the packaging heads 24,26 to the position illustrated in FIG. 7. The timer CTR-5 (line 180) setting is set to assure that the catcher assembly 42 is not pulled out too soon or too late.

When the extend head solenoid Y0 (line 75) was energized, it started blade extend delay counter CTR-6 (line 190–191) which delays extension of the hot blade or knife 164 (FIGS. 3B and 17) enabling the packaging heads to clamp the film strips together and to stretch the film over the article before the hot knife 164 engages the film. Counter CTR-6 is energized by closing extend head contact Y0; the timing pulse contact CR0 makes 38 counts (38/60 seconds) before timing out and energizing relay CR32.

Energization of relay CR32 closes contact CR32 (line 95) which energizes extend blade solenoid Y2 through a circuit including closed contacts CR26, CR32,CR2, and Y1. Energization of solenoid Y2 shifts valve V3 (FIG. 17) to its cross passage position thereby extending the blade cylinder urging the hot knife 164 into sealing and severing engagement with the film. It will be understood that the timer CTR-6 (line 191) enables the packaging heads 24 and 26, and the hot knife 164 to move toward the film at the same time.

The timer pulse relay CR0 (line 100) is illustrated between main lines L1 and L2 as being alternately energized and de-energized by its own relay contact CR0. This function is accomplished by the internal construction of the previously identified programmable controller 450 which scans the voltage peaks of the alternating current power supply. By counting alternate peaks, which for 60 HZ frequency power are 16.6 milliseconds apart, the controller thereby turns the several counters into timers.

When each of the packaging heads 24,26 are fully extended thereby clamping the associated film strips from movement, each head closes a limit switch LS11 (FIG. 18), which switches are connected in series. When both heads close their switches LS11, controller input X11 closes input contact X11 (line 45) to make a count; opens contact X11 (line 56) to de-energize relay CR18; and opens contact X11 (line 60) to deenergize fruit feed solenoid Y5. De-energization of Y5 causes spring return valve V6 (FIG. 17) to return to its illustrated position thereby reciprocating the fruit feed cylinders 350,352 which drop the fruit column onto the lower gates 346.

Control of the seal time is initiated by seal time counter CTR-7 (lines 105 and 106). When the hot knife 164 contacts the film backed by the resilient annulus 112 as shown in FIG. 6, limit switch LS14 and its contact X14 (FIG. 18 and line 106) are closed. This starts seal time counter CTR-7 which is sequenced by opening and closing the contact CR0 as previously described. The counter is set to provide an estimated 0.05 to 0.07 seconds of actual film contact time. The seal time can be lengthened or shortened in 0.0166 second increments to compensate for packaging head inertia and/or film sealing characteristics by resetting the counter CTR-7 thereby providing the optimum seal. When the counter counts out, control relay CR1 is energized closing contact CR1 (line 110) to energize relay CR2 which latches itself with the aid of closed limit switch X11. Energization of CR2 retracts the hot knife 164 by opening contact CR2 (line 95) which deenergizes solenoid Y2 allowing a spring to shift valve V3 (FIG. 17) to its illustrated retracted position. Retraction of the knife 164 opens limit switch LS14 and contact X14 thereby de-energizing seal time counter CTR-7 (line 105).

Energization of relay CR2 (line 110) closes contact CR2 (line 115) which energizes air cool solenoid Y11 (FIG. 17) which opens valve V5 and jets a ring of air at the sealing area to speed the cooling of the seal. Energization of CR2 (line 110) also starts a cool time counter CTR-8 (lines 120–121) by closing contact CR2 and the alternate closing of contact CR0 (line 120) as previously described. Counter CTR-8 times out in about one second thereby energizing relay CR3. During cool time the film strips are firmly clamped between the resilient annulus 112 (FIG. 6) and the cooperating annulus 114 thereby isolating the molten seal from tension in the film which is stretched over the fruit.

When counter CTR-8 times out and control relay CR3 (line 120) is energized, contact CR3 (line 125) closes thereby energizing relay CR10 through closed contact CR26 and closed contact X12 of limit switch LS-12. Energization of relay CR10 also closes contact CR10 (line 127) thereby latching relay CR10 by providing a holding circuit across CR26 and CR3; and contact CR10 (lines 70–72) closes thereby energizing retract head solenoid Y1. Solenoid Y1 latches itself through a contact Y1 (line 71) that is in series with closed contact CR12. Energization of solenoid Y1 (FIG. 17) shifts the valve V2 and retracts the head cylinder 118,118a and packaging heads 24,26 (FIG. 1) connected thereto. Energization of solenoid Y1 (line 70) also opens contact Y1 (line 77) thereby de-energizing extend head solenoid Y0 simultaneously with energization of retract head solenoid Y1. Contacts Y1 (line 85) and Y1 (line 61) close, and contact Y1 (line 95) opens thereby guaranteeing that the hot knife cannot extend during retraction of the heads.

When extend head solenoid Y0 (line 75) was de-energized, it de-energized relay CR22 (line 180–181) and relay CR32 (lines 190–191) by opening contacts Y0 in these lines.

When the packaging heads 24,26 begin retracting, the limit switches LS11 associated with each head open to open contact X11 de-energizing CR2 (line 110). As the heads retract, a limit switch LS2 (FIG. 18) located at a point intermediate the travel of the associated heads is momentarily closed thereby closing contact X2 (line 85) energizing relay CR4. Energization of relay CR4 opens contact CR4 (line 90) thereby de-energizing relay CR24 which opens contact CR24 (line 82) which de-energizes solenoid Y3 which allows the valve V4 (FIG. 17) to return to its illustrated position causing the article catchers 42 to move to their catching position illustrated in FIG. 2.

It will be understood that retraction of the two packaging heads 24,26 close two limit switches LS12 (FIG. 18) that are in series thereby providing power to input X12 of the controller 450. Power at X12 opens contact X12 (line 125) thereby de-energizing relay CR10.

Power at input X12 (FIG. 18) also starts the fruit feed delay timer CTR-3 (lines 55,56) by closing contact X12 which is in series with closed contact X11 and which cooperates with intermittently closed contact CR0. Since the fruit drops faster than the film strips feed through the annuluses 28,30 (FIG. 7) when unclamped, the timer CTR-3 assures that the film strips will be clamped between their associated annuluses 28,30 just before the fruit hits the fruit catcher 42 (FIG. 2). When the fruit feed timer CTR-3 times out, the counter energizes relay CR18 (line 55) which closes contact CR18 (line 61). Before the fruit is dropped, three conditions must be correct: contact CR18 (line 61) must be closed by the timer CTR-3 being timed out as above described; CR15 must be closed and is closed if the number of packaging cycles preset in the cycle counter CTR-2 (lines 45–46) has not been reached; and Y1 must be and is closed in response to the heads 24,26 being retracted. When the above three contacts are closed, fruit feed solenoid Y5 is energized shifting the valve V6 to the cross passage position closing gates 344 and opening gates 346 to drop an article (or fruit) onto the fruit catcher 42 (FIG. 2). If no article is dropped, nothing detrimental happens thus permitting the packaging machine to be operated for test purposes without using any fruit or other type of article therein. The packaging cycles described above, and illustrated in lines 60–191 of FIGS. 19A–19D are repeated until the cycle counter CTR-2 (lines 45,46) counts out. This energizes control relay CR16 (line 45) which opens contacts on lines 43 and 50. Opening contact CR16 (line 43) de-energizes control relays CR19 and CR20 and solenoid Y15 (lines 40–42), thus opening contacts on lines 141 and 146, de-energizing film drive solenoid Y8 (line 140) and brush roll motor solenoid Y9 (line 145), respectively.

Opening contact CR16 (line 50) de-energizes control relay CR15 (line 50), wich opens contact CR15 (line 61) thus preventing any further action by pneumatic components. The machine stays in this shut down condition until the three position switch S9-10 (FIG. 18) is turned from the "cycle" position, which stops power to input contact X10 (FIG. 18), opening a contact X10 (line 46) and thus de-energizing control relay CR16.

Although specific time intervals have been given for several of the counters and timers, it will be understood that different counts may be set in the counters and timers if desired.

It will be understood that controls are included in the electrical circuits to permit step-by-step operation of the machine. Thus by closing selected manually operated switches, certain functions may be performed without being automatically followed by others of the above described function. For example, the film may be advanced by placing film drive switch S0 (FIG. 18) on "manual" thereby directing power to input contact X0 (line 140) which energizes film drive solenoid Y8 thus driving the film drive motor 240 (FIG. 1). Although the different electrical components for the manually operated circuits are illustrated in FIGS. 18 and 19A–19D in order to fully disclose the preferred embodiment of the invention, these manual circuits will not be described in detail.

FIG. 20 is a timing diagram illustrating the results of a diagnostic check on a strip chart recorder when the wrapper is adjusted to wrap grape fruit at 42 fruit per minute. The cycle starts at 0 seconds and progresses to the left until one cycle is completed at 1.43 seconds.

The vertical lines of the diagram illustrate electrical signal changes which indicate the opening or closing of switches; or the energizing or de-energizing of solenoids. The several functions performed and the associated switches (X) or solenoids (Y) are identified at the right margin for ease in cross referencing the timing diagram with the electrical circuits disclosed in FIGS. 19A-19D. The several timers and counters in the electrical circuits were set to handle packaging speeds at rates of between about 25 to 45 grapefruit per minute. It will be understood, however, that the timers and counters may be reset to handle the articles at faster or slower speeds.

From the foregoing description it is apparent that the method, apparatus and articles manufactured of the present invention involves clamping two strips of film to capture two film portions, stretching the film portions over an article and clamping the two film portions together to define an annulus of contacting film which conforms to the peripheral shape of the article, and sealing and severing the film strips outwardly of the contacting film areas for providing a package which closely conforms to the shape of the article. The stretch film is preferably an inexpensive thermosealing film (which includes thermplastic films) which requires heat only for sealing and severing the film but does not require heat to cause the film to tightly conform to the shape of the article. When packaging a living article the characteristics of the stretch film reduces moisture migration from the article while permitting gases such as oxygen and carbon dioxide to diffuse into and out of the package.

Although the best mode contemplated for carrying out the present invention has been herein shown and described, it will be apparent that modification and variation may be made without departing from what is regarded to be the subject matter of the invention.

What is claimed is:

1. An apparatus for packaging an article in a stretchable container formed from thermal sealing film comprising: two pairs of annular outer clamping means for clamping and capturing the peripheries of two spaced article engaging planar portions of the film, means for positioning the article between the captured planar film portions, means for establishing relative novement of said two pairs of annular outer clamping means and said planar portions of the film toward each other for engaging and simultaneously stretching the captured film portions about opposing sides of the article, a single pair of inner annular clamping means for further stretching said article engaging portions of film over opposite sides of the article and thereafter clamping annuluses of the captured film portions together for defining isolated annuluses of film gripped between said outer pairs of clamping means and said single pair of inner annular clamping means, sealing means for providing a seal about the article in the isolated annuluses of the film, means for severing the captured portions from the film outwardly of the seal, and means for releasing the packaged article from the apparatus.

2. An apparatus according to claim 1 wherein said annular outer and inner clamping means have circular clamping surfaces for packaging an article having a generally circular periphery.

3. An apparatus according to claim 1 wherein the captured portions of the film include parallel film portions when spaced from the article, and wherein said outer annular clamping means and said inner annular clamping means conform generally to the cross-sectional shape of the article taken in a plane parallel to said parallel film portions and passing through the center of the article.

4. An apparatus according to claim 1 wherein said sealing and said severing means is a hot knife having a heated annular film contacting end portion shaped to puddle molten sealing material inwardly of said hot knife in sufficient amounts to seal the stretched article engaging film portions together, while permitting very little puddling to occur outwardly of the hot knife.

5. An apparatus according to claim 4 and additionally comprising passage defining means in said at least one of said annular clamping means, and means directing cooling fluid under pressure through said passage means and at said molten sealing material.

6. An apparatus according to claim 1 wherein the seal connecting the film together lies in a film sealing plane, and additional comprising means for adjusting at least one pair of said annular outer clamping means toward and away from said film sealing plane for providing the optimum angle of at least one of said isolated annuluses of film relative to the film sealing plane which provides the best seal.

7. An apparatus according to claim 1 wherein said means for moving said two pairs of outer clamping means moves each pair of outer clamping means equal amounts in opposite directions toward each other when stretching the captured film portions about the article.

8. An apparatus according to claim 7 wherein said means for moving said two pairs of outer clamping means moves said pairs of outer clamping means equal amounts in opposite directions away from each other when moving to an article receiving position.

9. An apparatus according to claim 3 wherein said parallel film portions are oriented in a substantially vertical planes.

10. An apparatus according to claim 1 wherein film engaging surfaces of said annular outer clamping means, said inner clamping means, said sealing means, and said severing means are circular.

11. An apparatus according to claim 1 wherein film engaging surfaces of said annular outer clamping means, said inner clamping means, said sealing means, and said severing means are non-circular.

12. An apparatus according to claim 1 and additionally comprising means for feeding two strips of film between associated annular outer clamping means when said film strips are released for movement.

13. An apparatus for packaging an article in a stretchable container formed from two strips of thermal sealing film comprising: means for moving the strips of film into spaced article receiving positions, outer annular clamping means associated with each film and having film engaging surfaces conforming to the general cross-sectional shape of the article for clamping and capturing article engaging portions of the film, means for positioning an article in packaging position between the article engaging portions of the films, means for moving each of said outer annular clamping means between an outer film receiving position and an inner position for stretching the captured film portions about the article, inner annular clamping means having film engaging portions conforming to the general cross-sectional shape of the article for clamping the captured film portions together and for defining isolated annuluses of the film strips between said inner and outer clamping means, means for moving said strips and a position clamping the film strips together, sealing and severing means engaging said isolated portions the films for sealing the article engaging portions of the film strips together and for severing the article engaging portions from the remaining strips to form a package around the article, and means for moving said sealing and severing means between a position spaced from the film strips and a position sealing an article within the captured portions of the film strips for packaging the article therein and severing the package from the film strips; each outer annular clamping means comprises a pair of parallel clamping plates each having an article shaped opening therein with said film engaging surfaces surrounding said openings, means for supporting said clamping plates for movement between a film receiving position spaced from each other and a film clamping position, resilient means for urging said clamping plates toward said spaced film receiving position, said means for moving said outer annular clamping means to said inner position being effective to first overcome said resilient means and move said clamping plates into clamping engagement with the associated film strip and thereafter move said clamping means to said inner positions stretching the captured film portions about the article.

14. An apparatus according to claim 13 wherein said clamping plates maintain firm clamping engagement of the film until the package has been sealed and severed from the film strips.

15. An apparatus according to claim 13 and additionally comprising passage means and outlet ports in one of said outer annular clamping means, and means for directing a cooling fluid through said passage means and out said ports for cooling said one clamping means and the seal.

16. An apparatus according to claim 13 wherein each strip of thermosealing film is drawn from a supply roll, and wherein said means for moving each strip of film comprises a first pair of film gripping rollers positioned on one side of the associated outer clamping means, means for continuously driving said first pair of rollers at a first speed, a second pair of rollers positioned on the other side of the associated outer clamping means for loosely gripping the associated film strip, means for driving said second pair of rollers at a speed faster than said first speed, when the film is clamped by said associated outer clamping means said first pair of continuously driven rollers being effective to form a loop of film, when said film is released by said one clamping means said second pair of rollers rapidly advancing said film to first pull out said loop and then tension the film between said two pairs of rollers.

17. An apparatus according to claim 16 wherein said second pair of rollers are continuously driven and slipped over the film when the film is clamped by said associated outer clamping means.

18. An apparatus according to claim 13 and additionally comprising control means for sequentially repeating said packaging operations on a plurality of additional articles.

19. A method of packaging an article in a stretchable container formed from film portions comprising the steps of clamping each film portion when spaced from each other to define captured planar portions of film, placing the article between said captured planar film portions, moving the captured planar film portions toward each other for first engaging and then stretching the captured planar film portions over the article to conform the article contacting portions of the film closely to the peripheral shape of the article, clamping the two captured and conformed film portions together in a sealing plane for defining an annulus of contacting film which conforms closely to the peripheral shape of that portion of the article that lies in said plane and for defining an isolated annulus of each captured film portion outwardly of said annulus of said contacting film, and sealing and severing the film in said isolated annuluses adjacent said contacting annulus of film for providing a package which closely conforms to the shape of the article.

20. A method according to claim 19 wherein said annulus of contacting film is a circular annulus.

21. A method according to claim 19 wherein said film is heat sealed and severed.

22. A method according to claim 19 wherein a hot knife is provided for heat sealing and severing, and wherein the hot knife is shaped for forming a substantial puddle of molten film inwardly relative to the line of severance and wherein very little molten material is formed outwardly of the line of severance.

23. A method according to claim 19 wherein the film portions are gas permeable film portions.

24. A method according to claim 19 wherein said seal is a continuous seal.

25. A method according to claim 19 wherein said seal is an intermittent seal permitting air to readily escape from the package while shrinking around the article.

* * * * *